US011452945B2

(12) United States Patent
Karafin et al.

(10) Patent No.: US 11,452,945 B2
(45) Date of Patent: Sep. 27, 2022

(54) LIGHT FIELD DISPLAY SYSTEM BASED AMUSEMENT PARK ATTRACTION

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US); John Dohm, Beverly Hills, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 17/156,419

(22) Filed: Jan. 22, 2021

(65) Prior Publication Data

US 2021/0220749 A1 Jul. 22, 2021

Related U.S. Application Data

(63) Continuation of application No. 16/635,920, filed as application No. PCT/US2019/043293 on Jul. 24, 2019, now Pat. No. 10,898,818.

(Continued)

(51) Int. Cl.
*G03H 1/22* (2006.01)
*A63G 31/16* (2006.01)
(Continued)

(52) U.S. Cl.
CPC ........... *A63G 31/16* (2013.01); *G03H 1/2205* (2013.01); *G03H 1/2249* (2013.01);
(Continued)

(58) Field of Classification Search
CPC ....... B60R 1/00; B60R 2300/30; G06F 3/016; G06F 3/013; G06F 3/011; G06F 3/1446;
(Continued)

(56) References Cited

U.S. PATENT DOCUMENTS 5,187,360 A 2/1993 Pasco
5,374,976 A 12/1994 Spannenburg
(Continued)

FOREIGN PATENT DOCUMENTS

CN 106716227 A 5/2017
WO 03083822 A1 10/2003
(Continued)

OTHER PUBLICATIONS

PCT International Search Report and Written Opinion, PCT Application No. PCT/US17/42275, dated Dec. 4, 2017, 21 pages.
(Continued)

*Primary Examiner* — Howard D Brown, Jr.
(74) *Attorney, Agent, or Firm* — Charles C. Yang

(57) ABSTRACT

A light filed (LF) display system for displaying holographic content to viewers in an amusement park (e.g., as part of an amusement park ride). The LF display system in an amusement park includes LF display modules tiled together to form an array of LF modules. In some embodiments, the LF display system includes a tracking system and/or a viewer profiling module. The tracking system and viewer profiling module can monitor and store characteristics of viewers on the amusement park ride, a viewer profile describing a viewer, and/or responses of viewers to the holographic content during the amusement park ride. The holographic content created for display on an amusement park ride can be based on any of the monitored or stored information.

20 Claims, 15 Drawing Sheets

Related U.S. Application Data

(60) Provisional application No. 62/703,410, filed on Jul. 25, 2018.

(51) Int. Cl.
 *H04N 13/368* (2018.01)
 *H04N 13/383* (2018.01)

(52) U.S. Cl.
 CPC ......... *H04N 13/368* (2018.05); *H04N 13/383* (2018.05); *G03H 2001/226* (2013.01); *G03H 2001/2223* (2013.01); *G03H 2223/16* (2013.01); *G03H 2226/05* (2013.01)

(58) Field of Classification Search
 CPC . G06F 3/017; G02B 27/0103; G02B 27/0179; G02B 2027/0187; G02B 2027/0141; G02B 2027/0138; G03H 1/0248; G03H 1/0005; G03H 2001/0216; G03H 2223/16; G03H 2223/24; G03H 2210/32; G03H 2210/50; G03H 1/2205; G03H 1/2249; G03H 2001/2223; G03H 2001/226; G03H 2226/05; F41H 3/00; A63G 31/16; H04N 13/368; H04N 13/383
 See application file for complete search history.

(56) References Cited

U.S. PATENT DOCUMENTS

| | | | |
|---|---|---|---|
| 5,481,385 A | 1/1996 | Zimmerman et al. | |
| 5,594,559 A | 1/1997 | Sato et al. | |
| 5,822,125 A | 10/1998 | Meyers | |
| 6,556,280 B1 | 4/2003 | Kelsey et al. | |
| 6,680,761 B1 | 1/2004 | Greene et al. | |
| 7,329,982 B2 | 2/2008 | Conner et al. | |
| 7,782,299 B2* | 8/2010 | Ogino | G06F 3/0304 345/158 |
| 8,218,210 B2* | 7/2012 | Gitter | G03H 1/2294 359/9 |
| 8,442,397 B2 | 5/2013 | Kang et al. | |
| 8,743,466 B2 | 6/2014 | Yamamoto | |
| 8,953,012 B2 | 2/2015 | Williams et al. | |
| 9,179,134 B2 | 11/2015 | Ranieri et al. | |
| 2003/0030912 A1 | 2/2003 | Gleckman et al. | |
| 2004/0108806 A1 | 6/2004 | Cok et al. | |
| 2004/0135100 A1 | 7/2004 | Menon et al. | |
| 2005/0243275 A1 | 11/2005 | Curatu | |
| 2005/0260677 A1 | 11/2005 | Saaski | |
| 2006/0171008 A1 | 8/2006 | Mintz et al. | |
| 2006/0191566 A1 | 8/2006 | Schaafsma | |
| 2008/0144174 A1 | 6/2008 | Lucente et al. | |
| 2008/0192313 A1 | 8/2008 | Matsumura et al. | |
| 2009/0147335 A1* | 6/2009 | Schumm, Jr. | G02B 30/56 359/33 |
| 2009/0237763 A1 | 9/2009 | Kramer et al. | |
| 2010/0149182 A1 | 6/2010 | Butler et al. | |
| 2010/0278480 A1 | 11/2010 | Vasylyev | |
| 2011/0032329 A1 | 2/2011 | Bauza et al. | |
| 2011/0134040 A1 | 6/2011 | Duparre et al. | |
| 2011/0157483 A1* | 6/2011 | Reichow | H04N 9/3197 348/E3.012 |
| 2011/0281660 A1 | 11/2011 | Schumm, Jr. et al. | |
| 2012/0057040 A1 | 3/2012 | Park et al. | |
| 2012/0182334 A1 | 7/2012 | Ranieri et al. | |
| 2012/0206726 A1 | 8/2012 | Pervez et al. | |
| 2012/0268950 A1 | 10/2012 | Parkyn et al. | |
| 2012/0300044 A1 | 11/2012 | Thomas et al. | |
| 2013/0027512 A1 | 1/2013 | Aronsson et al. | |
| 2013/0163089 A1 | 6/2013 | Bohn | |
| 2013/0019541 A1 | 8/2013 | Karbasivalashani et al. | |
| 2013/0216123 A1 | 8/2013 | Shroff et al. | |
| 2013/0255530 A1* | 10/2013 | Willcox | A63G 1/26 104/75 |
| 2013/0265485 A1 | 10/2013 | Kang | |
| 2014/0126322 A1 | 5/2014 | Cipolla et al. | |
| 2014/0132694 A1 | 5/2014 | Shacham et al. | |
| 2014/0320530 A1 | 10/2014 | Gruber et al. | |
| 2014/0370978 A1 | 12/2014 | Pececnik | |
| 2014/0371353 A1 | 12/2014 | Mitchell et al. | |
| 2015/0016777 A1 | 1/2015 | Abovitz et al. | |
| 2015/0178939 A1 | 6/2015 | Bradski et al. | |
| 2015/0219940 A1 | 8/2015 | Kim et al. | |
| 2015/0241608 A1 | 8/2015 | Shian et al. | |
| 2015/0331241 A1 | 11/2015 | Haddick | |
| 2016/0014395 A1 | 1/2016 | Murray et al. | |
| 2016/0037146 A1 | 2/2016 | McGrew | |
| 2016/0070059 A1 | 3/2016 | Chen et al. | |
| 2016/0180511 A1 | 6/2016 | Zhou et al. | |
| 2016/0205394 A1 | 7/2016 | Meng et al. | |
| 2016/0253835 A1 | 9/2016 | Conness et al. | |
| 2016/0353095 A1* | 12/2016 | Tait | H04N 13/334 |
| 2017/0150108 A1 | 5/2017 | Kong | |
| 2019/0201806 A1 | 7/2019 | Weston | |
| 2019/0378445 A1* | 12/2019 | Schubert | G09G 3/001 |

FOREIGN PATENT DOCUMENTS

| | | |
|---|---|---|
| WO | 2013147863 A1 | 10/2013 |
| WO | WO 2014/188149 A1 | 11/2014 |
| WO | WO 2016/046514 A1 | 3/2016 |
| WO | 2017193043 A1 | 11/2017 |
| WO | WO 2018/014009 A1 | 1/2018 |
| WO | WO 2018/014010 A1 | 1/2018 |
| WO | WO 2018/014027 A1 | 1/2018 |
| WO | WO 2018/014036 A1 | 1/2018 |
| WO | WO 2018/014040 A1 | 1/2018 |
| WO | WO 2018/014044 A1 | 1/2018 |
| WO | WO 2018/014045 A2 | 1/2018 |
| WO | WO 2018/014046 A1 | 1/2018 |
| WO | WO 2018/014047 A1 | 1/2018 |
| WO | WO 2018/014048 A2 | 1/2018 |
| WO | WO 2018/014049 A1 | 1/2018 |

OTHER PUBLICATIONS

PCT International Search Report and Written Opinion, PCT Application No. PCT/US17/42276, dated Nov. 24, 2017, 14 pages.
PCT International Search Report and Written Opinion, PCT Application No. PCT/US17/42418, dated Dec. 20, 2017, 11 pages.
PCT International Search Report and Written Opinion, PCT Application No. PCT/US17/42452, dated Nov. 17, 2017, ten pages.
PCT International Search Report and Written Opinion, PCT Application No. PCT/US17/42462, dated Oct. 30, 2017, eight pages.
PCT International Search Report and Written Opinion, PCT Application No. PCT/US17/42466, dated Nov. 28, 2017, 12 pages.
PCT International Search Report and Written Opinion, PCT Application No. PCT/US17/42467, dated Dec. 27, 2017, seven pages.
PCT International Search Report and Written Opinion, PCT Application No. PCT/US17/42468, dated Nov. 27, 2017, 11 pages.
PCT International Search Report and Written Opinion, PCT Application No. PCT/US17/42469, dated Oct. 12, 2017, ten pages.
PCT International Search Report and Written Opinion, PCT Application No. PCT/US17/42470, dated Dec. 28, 2017, 18 pages.
PCT International Search Report and Written Opinion, PCT Application No. PCT/US17/42679, dated Nov. 9, 2017, eight pages.
Wetzstein, G. et al., "On Plenoptic Multiplexing and Reconstruction," International Journal on Computer Vistion (IJCV), vol. 101, No. 2, Nov. 5, 2013, pp. 384-400.
PCT International Search Report and Written Opinion, PCT Application No. PCT/US19/43293, dated Oct. 21, 2019, 15 pages.
International Search Report and Written Opinion of PCT/US2019/043293 dated Oct. 21, 2019.
CN201980048248.6 First Office Action of the Chinese Patent Office dated Jun. 15, 2022.
"Use Cases and Requirements on Free-viewpoint Television (FTV) v.3", 114. MPEG Meeting; Feb. 2, 2016-Feb. 26, 2016; San Diego; (Motion Picture Expert Group or ISO/IEC JTC1/SC29/WG11),No. n16130 Mar. 24, 2016 (Mar. 24, 2016), XP030022803, Retrieved

(56) References Cited

OTHER PUBLICATIONS from the Internet: URL:http://phenix.int-evry.fr/mpeg/doc_end_user/documents/114_San%20Diego/wg11/w16130-v2-w16130.zip w16130.doc[retrieved on Mar. 24, 2016].
EP-19840854.4 European Extended Search Report of European Patent Office dated Jul. 11, 2022.
Kovacs et al: "Tangible Holographic 3D Objects with Virtual Touch", Interactive Tabletops & Surfaces, ACM, 2 Penn Plaza, Suite 701 New York NY 10121-0701 USA, Nov. 15, 2015 (Nov. 15, 2015), pp. 319-324, XP058077660, DOI: 10.1145/2817721.2823500 ISBN: 978-1-4503-3899-8.

\* cited by examiner

LIGHT FIELD DISPLAY SYSTEM BASED AMUSEMENT PARK ATTRACTION

CROSS REFERENCE TO RELATED APPLICATIONS

This application claims priority to U.S. Provisional Application Ser. No. 62/703,410, entitled "Light Field Display System Based Amusement Park Attraction", filed Jul. 25, 2018, which is incorporated by reference in its entirety.

This application is related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042470, and PCT/US2017/042679, all of which are incorporated by reference herein in their entirety.

BACKGROUND

The present disclosure relates to amusement park attractions, and specifically relates to light field display based amusement park attractions.

Conventional amusement park attractions (also referred to as rides) generally rely on physical props/décor, animatronics, and two-dimensional (2D) visual content for immersing viewers in the amusement park rides. However, physical props/décor and animatronics require extensive time and effort to set up and maintain. In order to change an amusement park ride, teams of workers may replace nearly all the physical props/décor and animatronics with new physical props/décor and new animatronics for the new ride. Moreover, the complexity of animatronics further requires excess time and effort for maintenance. Although presenting two-dimensional (2D) visual content is easily interchangeable, 2D content is limited in its ability to provide an immersive experience required of an amusement park ride.

SUMMARY

A light field (LF) display system for displaying holographic content to viewers of an amusement park (e.g., an amusement park ride or an amusement park queue). In some embodiments, the LF display system includes LF display modules that form a surface (e.g., wall, ceiling, floor, control panel, etc.) on the amusement park ride. In some embodiments, the LF display system includes LF display modules placed on either or both sides of an amusement park queue. As viewers wait in the queue, the LF display modules present holographic content to viewers in the queue. The LF display modules each have a display area and may be tiled together to form a seamless display surface that has an effective display area that is larger than the display area of the individual LF display module.

For example, in some embodiments, a LF display system comprises a controller configured to generate holographic content and a LF display assembly. The LF display assembly comprises one or more LF display modules that are configured to present the holographic content in a holographic object volume to one or more viewers located in a viewing volume of the one or more LF display modules of an amusement park ride.

In another example, in some embodiments, a LF display system comprises a controller configured to generate holographic content and a LF display assembly. The LF display assembly comprises one or more LF display modules that are configured to present the holographic content in a holographic object volume to one or more viewers located in a viewing volume of the one or more LF display modules of an amusement park queue.

In some embodiments, the LF display system includes a tracking system and/or a viewer profiling module. The tracking system and viewer profiling module can monitor and store characteristics of viewers on the amusement park ride, a viewer profile describing a viewer, and/or responses of viewers to the holographic content during the amusement park ride. The holographic content created for display on an amusement park ride can be based on any of the monitored or stored information.

In some embodiments, a user may interact with the holographic content, and the interaction can act as input for the holographic content creation system. For example, in some embodiments, some or all of the LF display system includes a plurality of ultrasonic speakers. The plurality of ultrasonic speakers may be configured to generate a haptic surface that coincides with at least a portion of the holographic content. The tracking system is configured to track an interaction of a user with the holographic object (e.g., via images captured by imaging sensors of the LF display modules and/or some other cameras). And the LF display system is configured to provide to create holographic content based on the interaction

Figure 1:
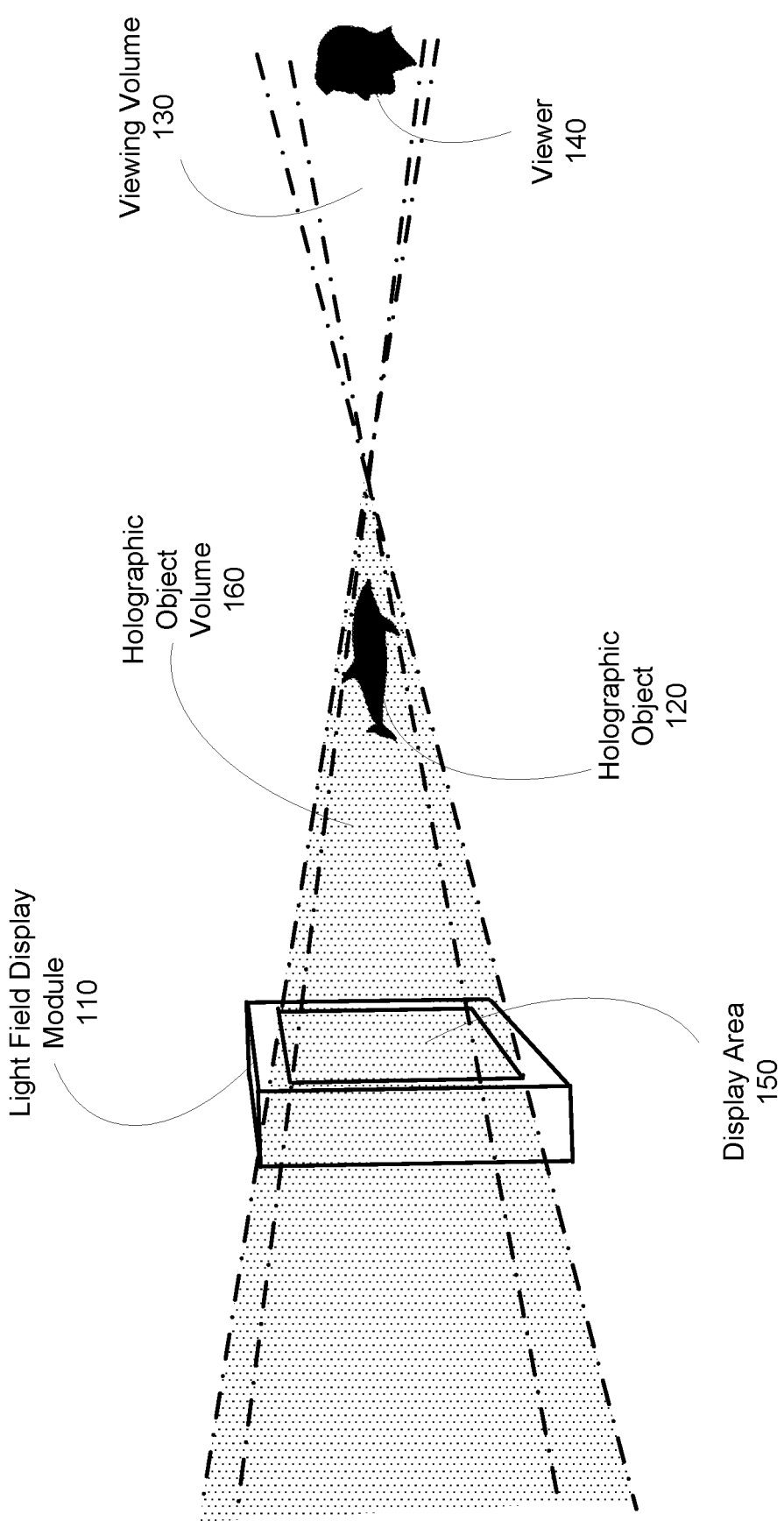
FIG. 1 is a diagram of a light field display module presenting a holographic object, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A light field (LF) display system is implemented in an amusement park ride to present viewers of the amusement park ride with holographic content which includes at least one holographic object. The LF display system comprises a LF display assembly configured to present holographic content including one or more holographic objects that would be visible to one or more users in a viewing volume of the amusement park ride. A holographic object may also be augmented with other sensory stimuli (e.g., tactile, audio, or smell). For example, ultrasonic emitters in the LF display system may emit ultrasonic pressure waves that provide a tactile surface for some or all of the holographic object. Holographic content may include additional visual content (i.e., 2D or 3D visual content). The coordination of emitters to ensure that a cohesive experience is enabled is part of the system in multi-emitter implementations (i.e., holographic objects providing the correct haptic feel and sensory stimuli at any given point in time.) The LF display assembly may include one or more LF display modules for generating the holographic content.

In some embodiments, the LF display system may include elements that enable the system to simultaneously emit at least one type of energy, and, simultaneously, absorb at least one type of energy for the purpose of responding to the viewers and creating an interactive experience. For example, a LF display system can emit both holographic objects for viewing as well as ultrasonic waves for haptic perception, and simultaneously absorb imaging information for tracking of viewers and other scene analysis, while also absorbing ultrasonic waves to detect touch response by the users. As an example, such a system may project a holographic creature, which when virtually "touched" by a viewer, modifies its "behavior" in accordance with the touch stimuli. The display system components that perform energy sensing of the environment may be integrated into the display surface via bidirectional energy elements that both emit and absorb energy, or they may be dedicated sensors that are separate from the display surface, such as ultrasonic speakers and imaging capture devices such as cameras.

The LF display system may be constructed to provide different experiences in many embodiments of an amusement park ride with the holographic objects generated. For example, the LF display system may be implemented to present holographic content to viewers waiting in a queue at the amusement park ride. The LF display assembly may form a single-sided or a multi-sided seamless surface environment. For example, the LF display assembly may form a multi-sided seamless surface environment that encapsulates an enclosure of an amusement park ride. Viewers of the LF display system may enter the enclosure which may be partially or completely transformed with holographic content generated by the LF display system. Holographic content may augment or enhance physical objects (e.g., chairs or benches) present in the enclosure. Moreover, viewers can freely gaze around the enclosure to view the holographic content without need of eyewear devices and/or headsets.

In some embodiments, an amusement park ride is an enclosure that viewers can move freely through (i.e., in an unconstrained manner). The enclosure has surfaces that are covered by LF display modules of the LF display assembly. For example, in some instances some or all of the walls, the ceiling, and the floor are covered with the LF display modules. The enclosure may be constructed in a variety of configurations ranging from fixed entry and exit points with controlled movement to open areas providing a full immersive experience. The LF display system presents holographic content to viewers as they move through the enclosure (e.g., walking or via vehicle). In some cases, the holographic content is presented in a manner that provides a perception of moving in a generally straight direction when in fact the viewer has moved along a curved path. The enclosure may be segmented (e.g., physically or via displayed holographic content) to provide holographic content to viewers within various portions of the enclosure. The LF display system may receive input through a tracking system and/or a sensory feedback system. Furthermore, elements of the enclosure may incorporate mechanical facilities (e.g., a moving floor, dynamic walking paths, or a motor-controlled vehicle that transports passengers) that, when combined with various energy emissions (e.g., light, sound, or simulated weather) alter the movement path of viewers. Based on the input, the LF display system can adjust the holographic content as well as provide feedback to related components.

The LF display system may also incorporate a system for tracking movement of viewers at least within the viewing volume of the LF display system. The tracked movement of the viewers can be used to enhance the immersive experience of the ride. For example, the LF display system can use the tracking information to facilitate viewer interactions with the holographic content (e.g., pushing a holographic button). The LF display system can use the tracked information to monitor finger location relative to a holographic object. For example, the holographic object may be a button that can be "pushed" by a viewer. The LF display system can project ultrasonic energy to generate a tactile surface that corresponds to the button and occupies substantially the same space as the button. The LF display system can use the tracking information to dynamically move the location of the tactile surface along with dynamically moving the button as it is "pushed" by the viewer. The LF display system may use the tracking information to render a holographic object that looks at and/or make eye contact, or interacts in other ways with the viewers. The LF display system may use the tracking information to render a holographic object that "touches" a viewer, where ultrasonic speakers create a tactile surface by which the holographic object can interact, via touch, with a viewer.

Additionally, the LF display system may incorporate a viewer profiling module for identifying each viewer to provide personalized content to each viewer. The viewer profiling module may further record other information on the viewer's visit to the amusement park ride which can be used on a subsequent visit for personalizing holographic content.

Light Field Display System

FIG. 1 is a diagram 100 of a light field (LF) display module 110 presenting a holographic object 120, in accordance with one or more embodiments. The LF display module 110 is part of a light field (LF) display system. The LF display system presents holographic content including at least one holographic object using one or more LF display modules. The LF display system can present holographic content to one or multiple viewers. In some embodiments, the LF display system may also augment the holographic content with other sensory content (e.g., touch, audio, smell, temperature, etc.). For example, as discussed below, the projection of ultrasonic sound waves may be used to generate pressure waves that can simulate a surface of some or all of a holographic object. The LF display system includes one or more LF display modules 110, and is discussed in detail below with regard to FIGS. 2A-5.

The LF display module 110 is a holographic display that presents holographic objects (e.g., the holographic object 120) to one or more viewers (e.g., viewer 140). The LF display module 110 includes an energy device layer (e.g., an emissive electronic display or acoustic projection device) and an energy waveguide layer (e.g., optical lens array). Additionally, the LF display module 110 may include an energy relay layer for the purpose of combining multiple energy sources or detectors together to form a single surface. At a high-level, the energy device layer generates energy (e.g., holographic content) that is then directed using the energy waveguide layer to a region in space in accordance with one or more four-dimensional (4D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume as well as ultrasonic pressure. The operation of the LF display module 110 is discussed in more detail below with regard to FIGS. 2A-3B.

The LF display module 110 generates holographic objects within a holographic object volume 160 using one or more 4D light field functions (e.g., derived from a plenoptic function). The holographic objects can be three-dimensional (3D), two-dimensional (2D), or some combination thereof. Moreover, the holographic objects may be polychromatic (e.g., full color). The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the surface of the display area 150 (i.e., towards the viewer 140) such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within a viewing volume 130, such that they are indistinguishable from actual objects. A holographic object is formed by projecting the same light rays that would be generated from the surface of the object were it physically present.

In some cases, the holographic object volume 160 and the corresponding viewing volume 130 may be relatively small—such that it is designed for a single viewer. In other embodiments, as discussed in detail below with regard to, e.g., FIGS. 4A-4F, 6A-6B, and 8A-8B, the LF display modules may be enlarged and/or tiled to create larger holographic object volumes and corresponding viewing volumes that can accommodate a large range of viewers (e.g., one to thousands). The LF display modules presented in this disclosure may be built so that the full surface of the LF display contains holographic imaging optics, with no inactive or dead space, and without any need for bezels. In these embodiments, the LF display modules may be tiled so that the imaging area is continuous across the seam between LF display modules, and the bond line between the tiled modules is virtually undetectable using the visual acuity of the eye. Notably, in some configurations, some portion of the display surface may not include holographic imaging optics, although they are not described in detail herein.

The flexible size and/or shape of a viewing volume 130 allows for viewers to be unconstrained within the viewing volume 130. For example, a viewer 140 can move to a different position within a viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a dolphin. The viewer 140 may move to other locations relative to the holographic object 120 to see different views of the dolphin. For example, the viewer 140 may move such that he/she sees a left side of the dolphin, a right side of the dolphin, etc., much like if the viewer 140 was looking at an actual dolphin and changed his/her relative position to the actual dolphin to see different views of the dolphin. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) in order to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device, nor be confined to a particular position, in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. In order to increase the size of the holographic object volume 160, a size of a display area 150 of the LF display module 110 may be increased and/or multiple LF display modules may be tiled together in a manner that forms a seamless display surface. The seamless display surface has an effective display area that is larger than the display areas of the individual LF display modules. Some embodiments relating to tiling LF display modules are discussed below with regard to FIGS. 4A-4F, 6A-6B, and 8A-8B. As illustrated in FIG. 1, the display area 150 is rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content in the holographic object volume 160 behind the plane of the display area 150. For example, the LF display module 110 may make the display area 150 appear to be a surface of the ocean that the holographic object 120 is jumping out of And the displayed content may be such that the viewer 140 is able to look through the displayed surface to see marine life that is under the water. Moreover, the LF display system can generate content that seamlessly moves around the holographic object volume 160, including behind and in front of the plane of the display area 150.

Figure 2A:
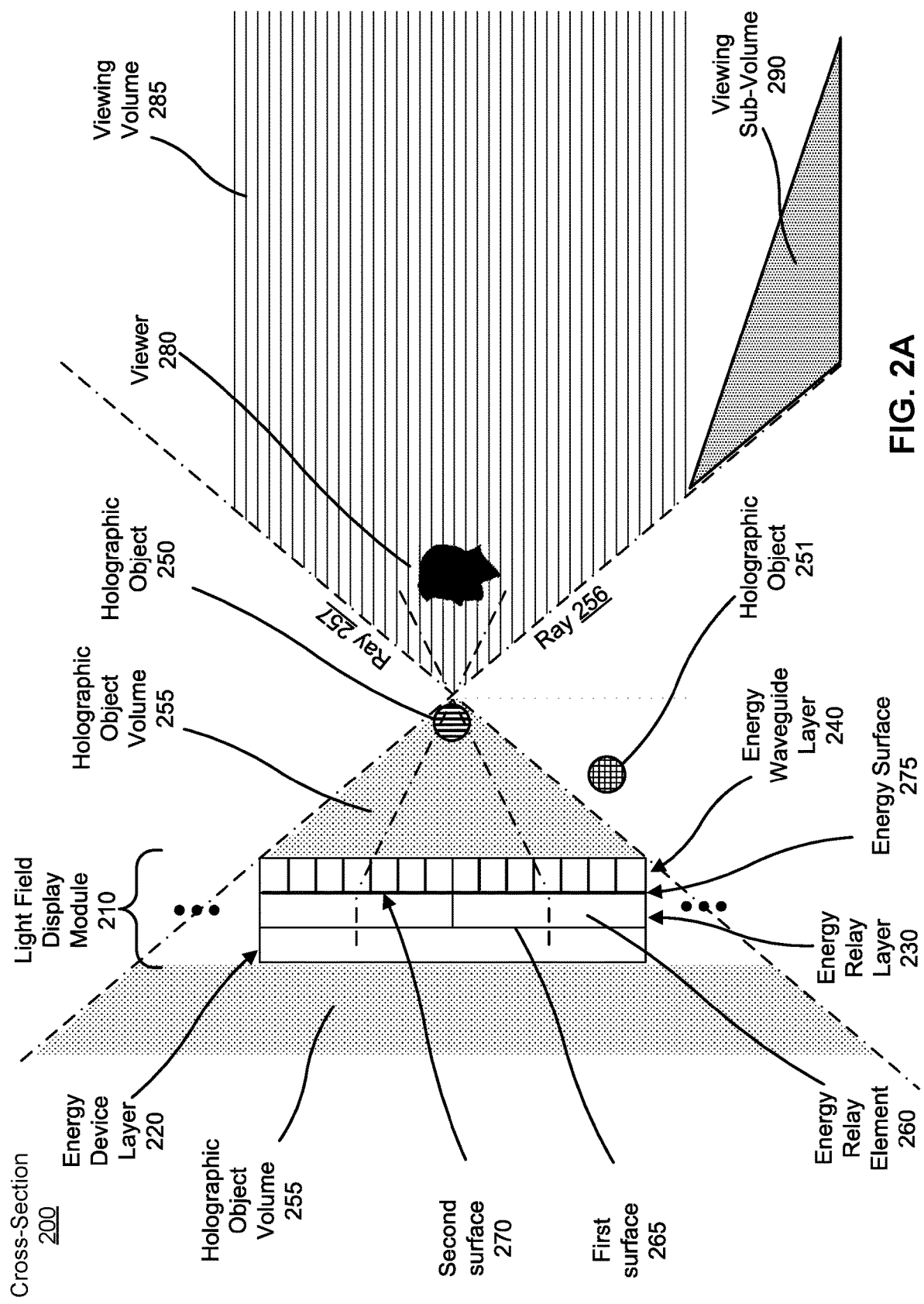
FIG. 2A is a cross section of a portion of a light field display module, in accordance with one or more embodiments.

FIG. 2A illustrates a cross section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. In other words, the various coordinates on the display surface act as projection locations for emitted energy. The directed energy from the display surface enables convergence of many rays of energy, which, thereby, can create holographic objects. For visible light, for example, the LF display will project a very large number of light rays from the projection locations that may converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewer perspective may change on any given holographic object, and the viewer will see a different view of that holographic object.

The energy device layer 220 includes one or more electronic displays (e.g., an emissive display such as an OLED) and one or more other energy projection and/or energy receiving devices as described herein. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic projection device generates one or more pressure waves that complement the holographic object 250. The generated pressure waves may be, e.g., audible, ultrasonic, or some combination thereof. An array of ultrasonic pressure waves may be used for volumetric tactile sensation (e.g., coincident with a surface of the holographic object 250). An audible pressure wave is used for providing audio content (e.g., immersive audio) that can complement the holographic object 250. For example, assuming the holographic object 250 is a dolphin, one or more acoustic projection devices may be used to (1) generate a tactile surface that is collocated with a surface of the dolphin such that viewers may touch the holographic object 250; and (2) provide audio content corresponding to noises a dolphin makes such as clicks, chirping, or chatter. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor may be sensitive to light in a visible optical band, and in some cases, may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensor for position location tracking of viewers.

In some configurations, the energy relay layer 230 relays energy (e.g., electromagnetic energy, mechanical pressure waves, etc.) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device). An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having, for example, 20/40 vision, such that the energy surface 275 is effectively seamless from the perspective of a viewer 280 within a viewing volume 285.

In some embodiments, the second surfaces of adjacent energy relay elements are fused together with processing steps that may include one or more of pressure, heat, and a chemical reaction, in such a way no seam exists between them. And still in other embodiments, an array of energy relay elements is formed by molding one side of a continuous block of relay material into an array of small taper ends, each configured to transport energy from an energy device attached to the small tapered end into a single combined surface with a larger area which is never subdivided.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiently relayed between these surfaces without any significant loss in resolution.

The energy waveguide layer 240 directs energy from a location (e.g., a coordinate) on the energy surface 275 into a specific energy propagation path outward from the display surface into the holographic viewing volume 285 using waveguide elements in the energy waveguide layer 240. The energy propagation path is defined by two angular dimensions determined at least by the energy surface coordinate location relative to the waveguide. The waveguide is associated with a spatial 2D coordinate. Together, these four coordinates form a four-dimensional (4D) energy field. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface 277 that may be perceived by a user, but these could be other projected rays. The rays define the field-of-view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
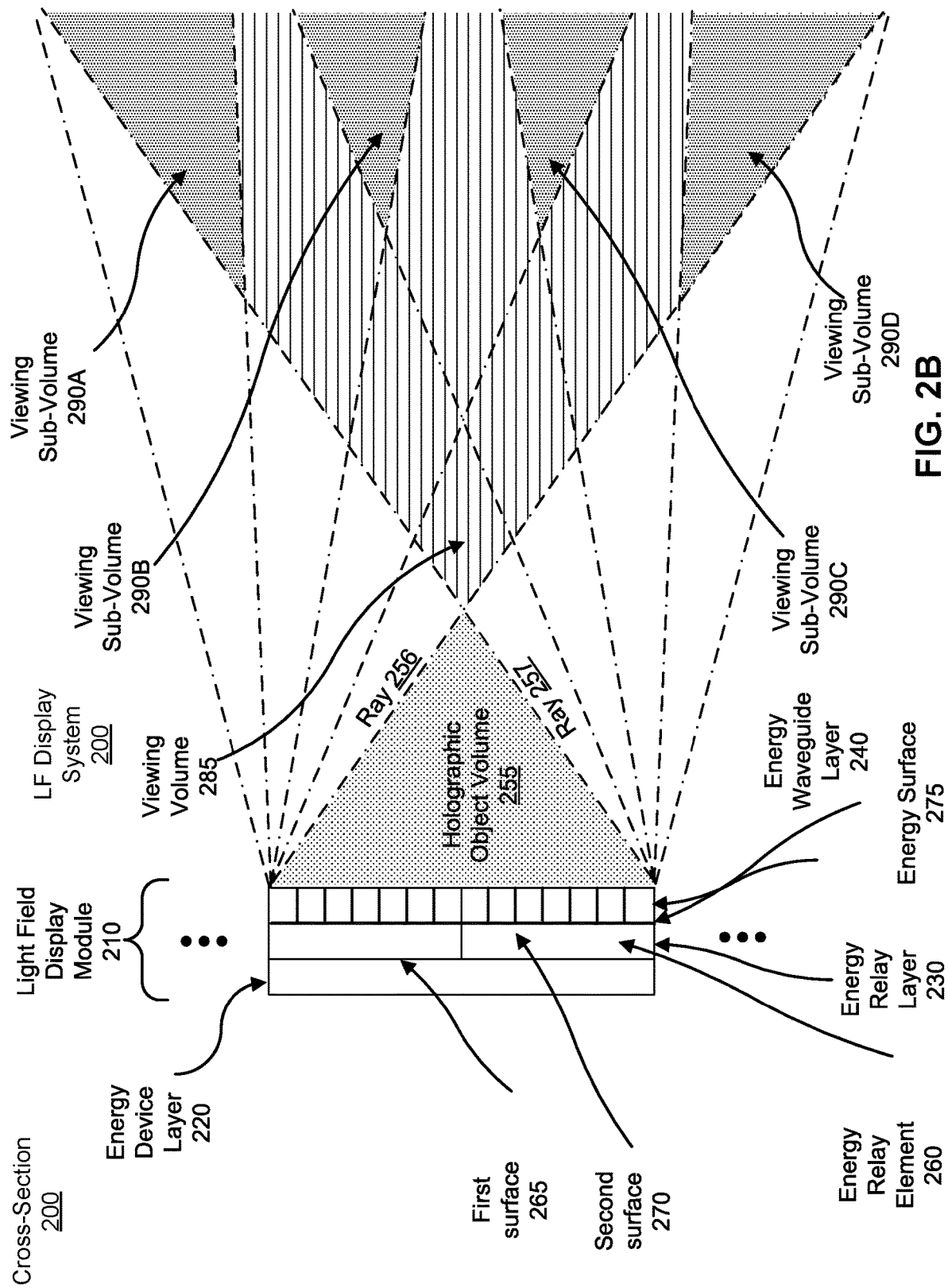
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by LF display system 200 in other example holographic object volumes. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4D light field function. Moreover, as the viewer 280 moves within the viewing volume 285 he/she would also see different perspectives of the holographic object 250 as would other viewers within the viewing volume 285. As will be appreciated by one of ordinary skill in the art, a 4D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 may include two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, with no energy relay layer, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
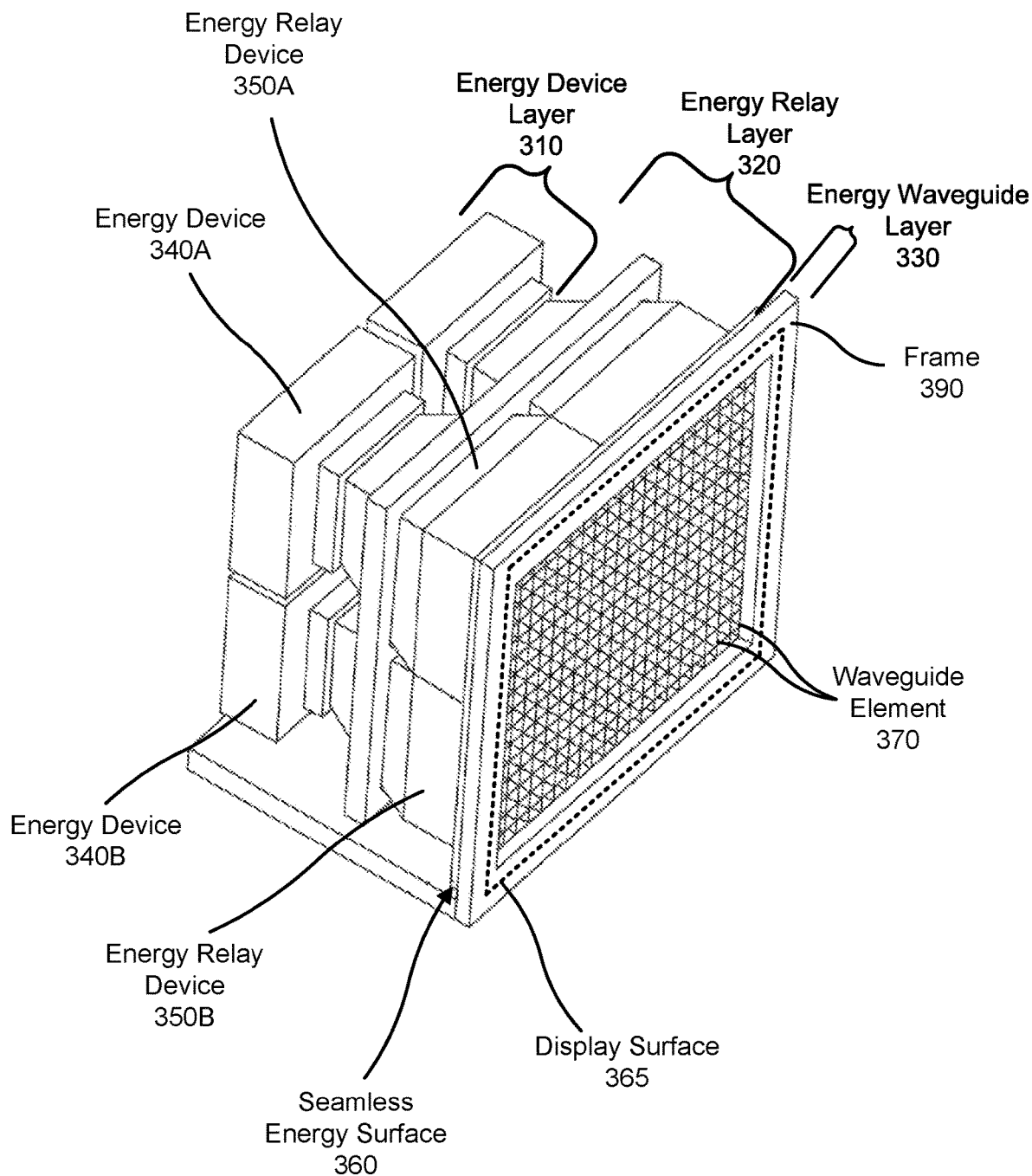
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. The display surface 365 includes a plurality of projection locations from which energy can be projected. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay devices 350 (three are visible in the figure). The energy relay devices 350 may all relay the same type of energy (e.g., light), or may relay one or more different types (e.g., light and sound). Each of the relay devices 350 includes a first surface and a second surface, the second surface of the energy relay devices 350 being arranged to form a singular seamless energy surface 360. In the illustrated embodiment, each of the energy relay devices 350 are tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of LF display module 300A together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4D light field function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface, and allow the projection of an energy field in additional to the light field. In one embodiment, an acoustic energy field may be projected from electrostatic speakers (not illustrated) mounted at any number of locations on the seamless energy surface 360. Further, the electrostatic speakers of the LF display module 300A are positioned within the light field display module 300A such that the dual-energy surface simultaneously projects sound fields and holographic content. For example, the electrostatic speakers may be formed with one or more diaphragm elements that are transmissive to some wavelengths of electromagnetic energy, and driven with one or more conductive elements (e.g., planes which sandwich the one or more diaphragm elements). The electrostatic speakers may be mounted on to the seamless energy surface 360, so that the diaphragm elements cover some of the waveguide elements. The conductive electrodes of the speakers may be co-located with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit sound fields and sense sound, emit light fields and sense light).

More broadly, an energy device 340 of a LF display module 340 can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between electromagnetic waveguide elements, and/or co-located with structures designed to inhibit light transmission between electromagnetic waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under any particular waveguide element 370 are all energy sources, all energy sensors, or a mix of energy sources and energy sensors.

Figure 3B:
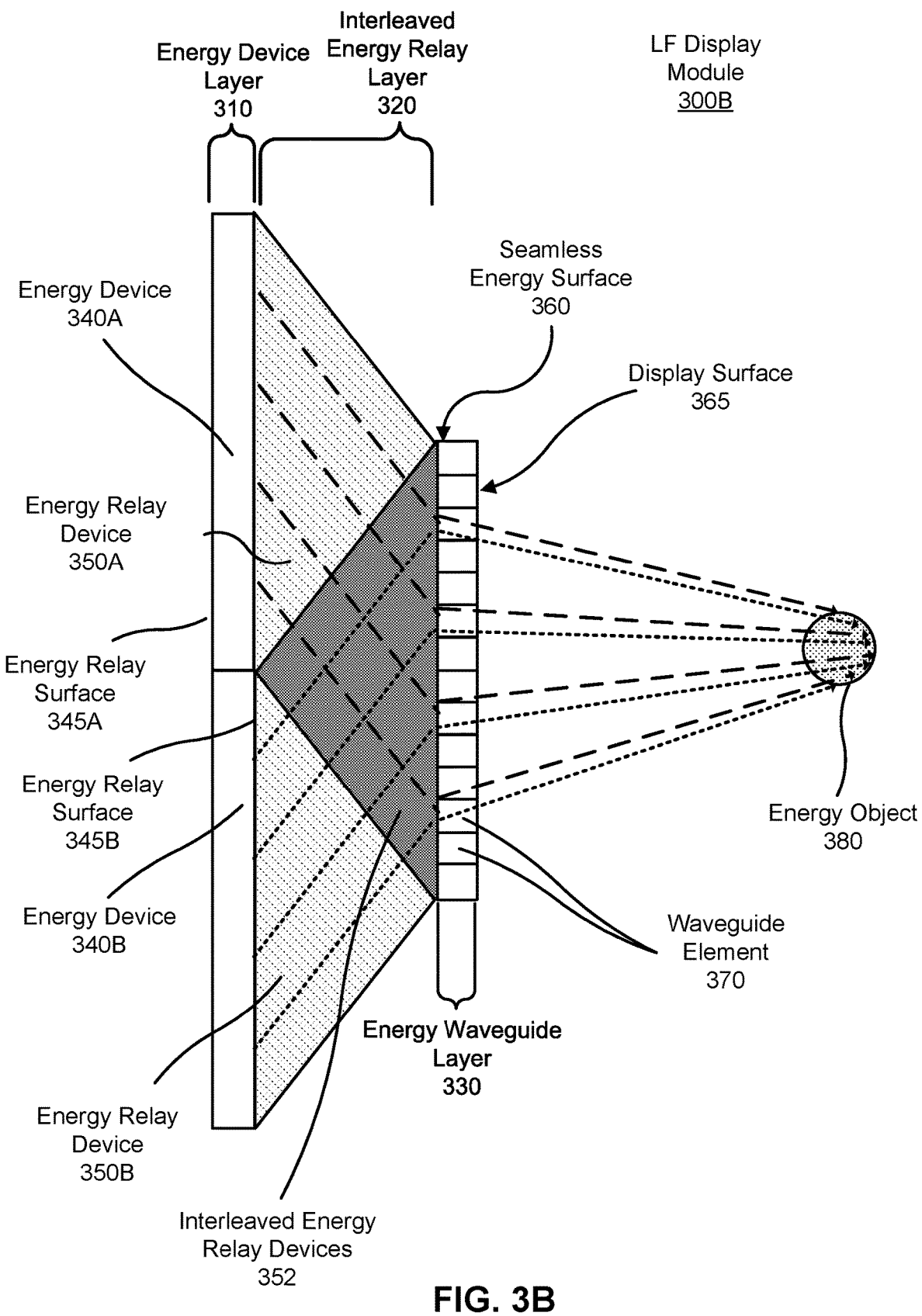
FIG. 3B is a cross-sectional view of a light field display module which includes interleaved energy relay devices, in accordance with one or more embodiments.

FIG. 3B is a cross-sectional view of a LF display module 300B which includes interleaved energy relay devices, in accordance with one or more embodiments. Energy relay device 350A transports energy between the energy relay first surface 345A connected to energy device 340A, and the seamless energy surface 360. Energy relay 350B transports energy between the energy relay first surface 345B connected to energy device 340B, and the seamless energy surface 360. Both relay devices are interleaved at interleaved energy relay device 352, which is connected to the seamless energy surface 360. In this configuration, surface 360 contains interleaved energy locations of both energy devices 340A and 340B, which may be energy sources or energy sensors. Accordingly, the LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 300B may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regard to FIG. 3A. Additionally, the LF display module 300B may present and/or receive energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 300B that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area in FIG. 3B. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side (i.e., the front side), of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source (e.g., energy device 340A) and an imaging sensor is used as an energy sensor (e.g., energy device 340B). In this manner, the LF display module 300B can simultaneously project holographic content and detect light from the volume in front of the display surface 365. In this manner, this embodiment of the LF display module 300B functions as both a LF display and an LF sensor.

In an embodiment, the LF display module 300B is configured to simultaneously project a light field from projection locations on the display surface to the front of the display surface and capture a light field from front of the display surface at the projection locations. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 300B may be configured such that the locations at the seamless energy surface 365 that are under a particular waveguide element 370 are all emissive display locations, all imaging sensor locations, or some combination of these locations. In other embodiments, the bidirectional energy surface can project and receive various other forms of energy.

In another example embodiment of the LF display module 300B, the LF display module is configured to project two different types of energy. For example, in an embodiment, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the LF display module 300B with interleaved energy relay devices may include multiple energy device layers with each energy device layer including a specific type of energy device. In these examples, the energy relay layers are configured to relay the appropriate type of energy between the seamless energy surface 360 and the energy device layer 310.

Tiled LF Display Modules

Figure 4A:
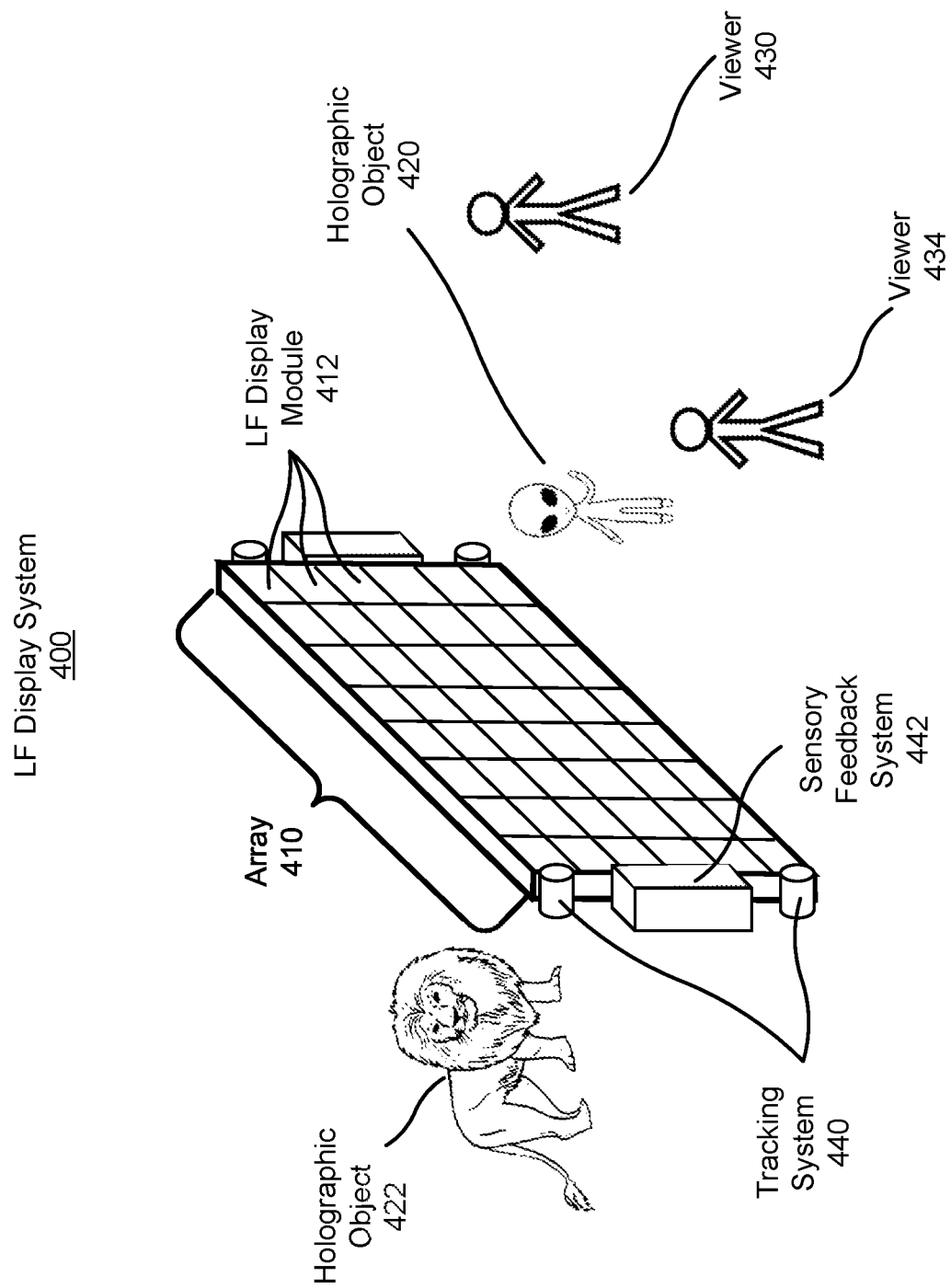
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The LF display module 412 may be the same as LF display module 300A or 300B. The array 410 may cover, for example, some or all of a surface (e.g., a wall) of a room. The LF array may cover other surfaces, such as, for example, a table top, a billboard, a rotunda, etc.

The array 410 may project one or more holographic objects. For example, in the illustrated embodiment, the array 410 projects a holographic object 420 and a holographic object 422. Tiling of the LF display modules 412 allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 420. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 430 and the viewer 434 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434.

In some embodiments, the LF display system 400 may include a tracking system that tracks positions of the viewer 430 and the viewer 434. In some embodiments, the tracked position is the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 430 and the eyes of the viewer 434 are in different locations.

In various configurations, the LF display system 400 may include one or more tracking systems. For example, in the illustrated embodiment of FIG. 4A, LF display system includes a tracking system 440 that is external to the array 410. Here, the tracking system may be a camera system coupled to the array 410. External tracking systems are described in more detail in regard to FIG. 5. In other example embodiments, the tracking system may be incorporated into the array 410 as described herein. For example, an energy device (e.g., energy device 340) of one or more LF display modules 412 containing a bidirectional energy surface included in the array 410 may be configured to capture images of viewers in front of the array 410. In whichever case, the tracking system(s) of the LF display system 400 determines tracking information about the viewers (e.g., viewer 430 and/or viewer 434) viewing holographic content presented by the array 410.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include various systems configured to determine tracking information. For example, the tracking system may include one or more infrared sources (e.g., structured light sources), one or more imaging sensors that can capture images in the infrared (e.g., red-blue-green-infrared camera), and a processor executing tracking algorithms. The tracking system may use the depth estimation techniques to determine positions of viewers. In some embodiments, the LF display system 400 generates holographic objects based on tracked positions, movements, or gestures of the viewer 430 and/or the viewer 434 as described herein. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. Similarly, the viewer 434 may be presented with the holographic object 422, but not the holographic object 420. For example, the LF display system 400 tracks a position of each of the viewer 430 and the viewer 434. The LF display system 400 determines a perspective of a holographic object that should be visible to a viewer based on their position relative to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume (i.e., similar to the viewing sub-volumes 290A, 290B, 290C, and 290D shown in FIG. 2B). For example, as illustrated, because the LF display system 400 can track the position of the viewer 430, the LF display system 400 may present space content (e.g., holographic object 420) to a viewing sub-volume surrounding the viewer 430 and safari content (e.g., holographic object 422) to a viewing sub-volume surrounding the viewer 434. In contrast, conventional systems would have to use individual headsets to provide a similar experience.

In some embodiments the LF display system 400 may include one or more sensory feedback systems. The sensory feedback systems provide other sensory stimuli (e.g., tactile, audio, or smell) that are presented with the holographic content and augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in regard to FIG. 5. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system 442 that includes one or more acoustic projection devices external to the array. Alternatively or additionally, the LF display system 400 may include one or more acoustic projection devices integrated into the array 410 as described herein. The acoustic projection devices may consist of an array of ultrasonic sources configured to project a volumetric tactile surface. In some embodiments, the tactile surface may be coincident with a holographic object (e.g., at a surface of the holographic object 420) for one or more surfaces of a holographic object if a portion of a viewer gets within a threshold distance of the one or more surfaces. The volumetric tactile sensation may allow the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a holographic object.

In various embodiments, the LF display system 400 may provide other sensory stimuli based in part on a tracked position of a viewer. For example, the holographic object 422 illustrated in FIG. 4A is a lion, and the LF display system 400 may have the holographic object 422 roar both visually (i.e., the holographic object 422 appears to roar) and audibly (i.e., one or more acoustic projection devices project a pressure wave that the viewer 430 perceives as a lion's roar emanating from the holographic object 422.

Note that, in the illustrated configuration, the holographic viewing volume may be limited in a manner similar to the viewing volume 285 of the LF display system 200 in FIG. 2A-2B. This can limit the amount of perceived immersion that a viewer will experience with a single wall display unit. One way to address this is to use multiple LF display modules that are tiled along multiple sides as described below with respect to FIGS. 4B-4F, 6B, and 8A-8B.

Figure 4B:
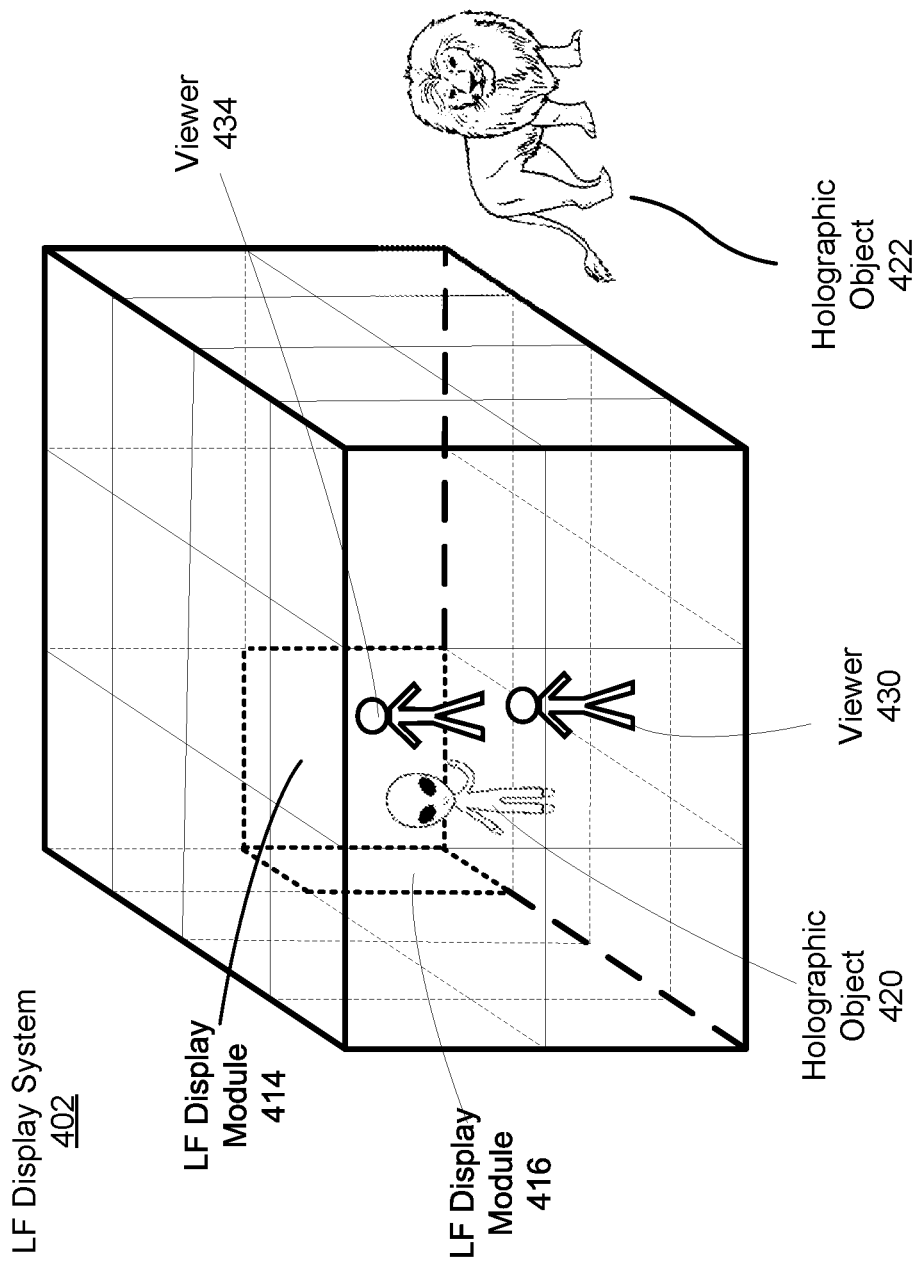
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. The LF display system 402 is substantially similar to the LF display system 400 except that the plurality of LF display modules are tiled to create a multi-sided seamless surface environment. More specifically, the LF display modules are tiled to form an array that is a six-sided aggregated seamless surface environment. In FIG. 4B, the plurality of LF display modules cover all the walls, the ceiling, and the floor of a room. In other embodiments, the plurality of LF display modules may cover some, but not all of a wall, a floor, a ceiling, or some combination thereof. In other embodiments, a plurality of LF display modules are tiled to form some other aggregated seamless surface. For example, the walls may be curved such that a cylindrical aggregated energy environment is formed. Alternatively, the walls and ceiling may be curved to form a spherical aggregated energy surface environment.

The LF display system 402 may project one or more holographic objects. For example, in the illustrated embodiment the LF display system 402 projects the holographic object 420 into an area enclosed by the six-sided aggregated seamless surface environment. In this example, the viewing volume of the LF display system is also contained within the six-sided aggregated seamless surface environment. Note that, in the illustrated configuration, the viewer 434 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420 and be observed by viewer 430. In this manner, occlusion by viewers in the space can cause some portion of the holographic projections to disappear, but the effect is much less than if only one side of the volume was populated with holographic display panels. Holographic object 422 is illustrated "outside" the walls of the six-sided aggregated seamless surface environment because the holographic object volume extends behind the aggregated surface. Thus, the viewer 430 and/or the viewer 434 can perceive the holographic object 422 as "outside" of the enclosed six-sided environment which they can move throughout.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface that approximates the walls of a room. In some other examples, an aggregate surface may only occur on a portion of a surface (e.g., half of a wall) rather than a whole surface (e.g., an entire wall). Some examples are described herein.

In some configurations, the aggregate surface of a LF display system may include an aggregate surface configured to project energy towards a localized viewing volume. Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
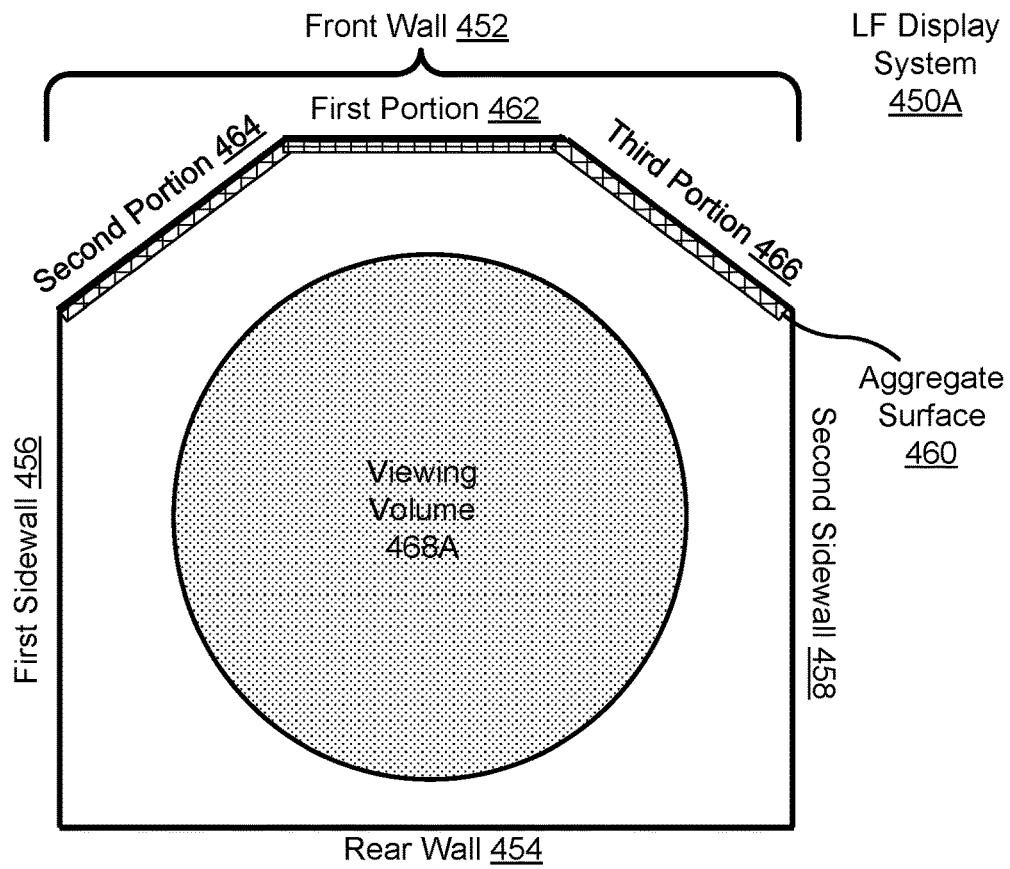
FIG. 4C is a top-down view of a light field display system with an aggregate surface in a winged configuration, in accordance with one or more embodiments.

For example, FIG. 4C illustrates top down view of a LF display system 450A with an aggregate surface in a "winged" configuration. In this example, the LF display system 450A is located in a room with a front wall 452, a rear wall 454, a first sidewall 456, a second sidewall 458, a ceiling (not shown), and a floor (not shown). The first sidewall 456, the second sidewall 458, the rear wall 454, floor, and the ceiling are all orthogonal. The LF display system 450A includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the first sidewall 456 and placed at an angle to project energy towards the center of the room (i.e., a first side surface), and (iii) a third portion 466 connecting the first portion 462 to the second sidewall 458 and placed at an angle to project energy towards the center of the room (i.e., a second side surface). The first portion is a vertical plane in the room and has a horizontal and a vertical axis. The second and third portions are angled towards the center of the room along the horizontal axis.

In this example, the viewing volume 468A of the LF display system 450A is in the center of the room and partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers.

Figure 4D:
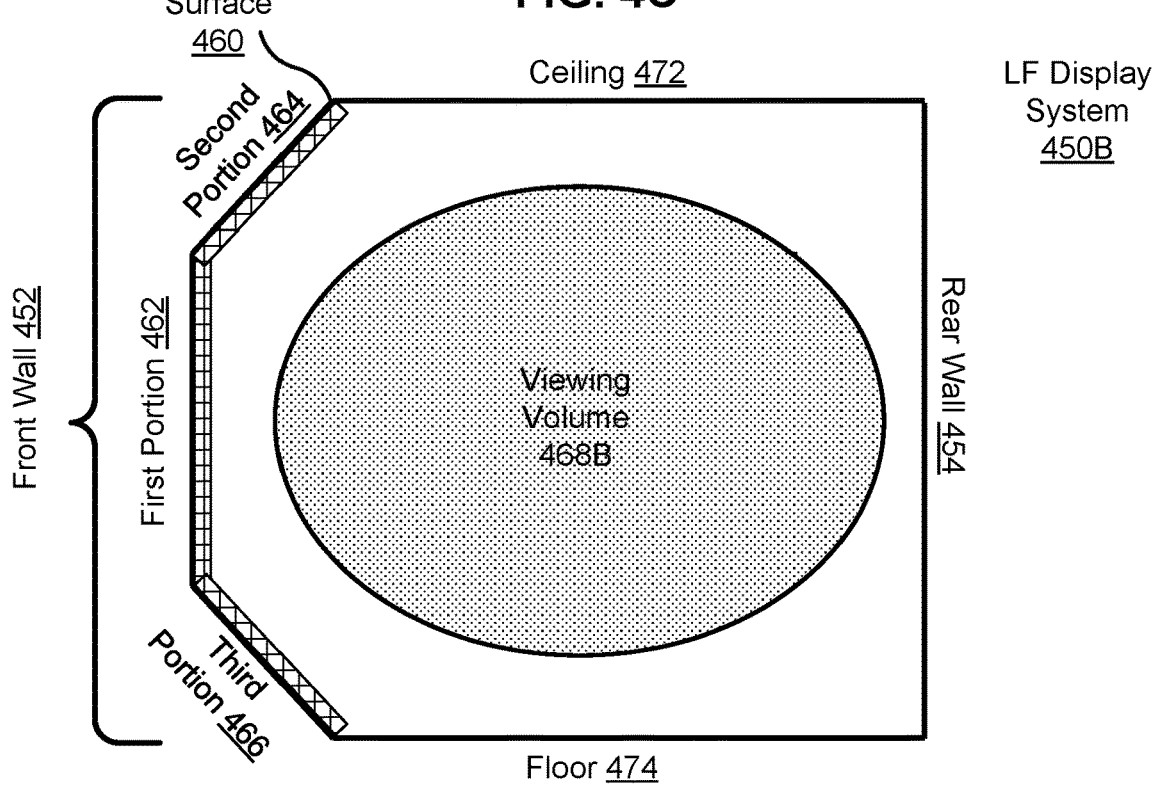
FIG. 4D is a side view of a light field display system with an aggregate surface in a sloped configuration, in accordance with one or more embodiments.

In a similar example, FIG. 4D illustrates a side view of a LF display system 450B with an aggregate surface in a "sloped" configuration. In this example, the LF display system 450B is located in a room with a front wall 452, a rear wall 454, a first sidewall (not shown), a second sidewall (not shown), a ceiling 472, and a floor 474. The first sidewall, the second sidewall, the rear wall 454, floor 474, and the ceiling 472 are all orthogonal. The LF display system 450B includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the ceiling 472 and angled to project energy towards the center of the room (i.e., a first side surface), and (iii) a third portion 464 connecting the first portion 462 to the floor 474 and angled to project energy towards the center of the room (i.e., a second side surface). The first portion is a vertical plane in the room and has a horizontal and a vertical axis. The second and third portions are angled towards the center of the room along the vertical axis.

In this example, the viewing volume 468B of the LF display system 450B is in the center of the room and partially surrounded by the three portions of the aggregate surface 460. Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, deflection optics may be used to optimize the size and position of the viewing volume 468B.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front wall were used.

Additionally, the configuration of the LF display system and the environment which it is located may inform the shape and locations of the viewing volumes and viewing sub-volumes.

Figure 4E:
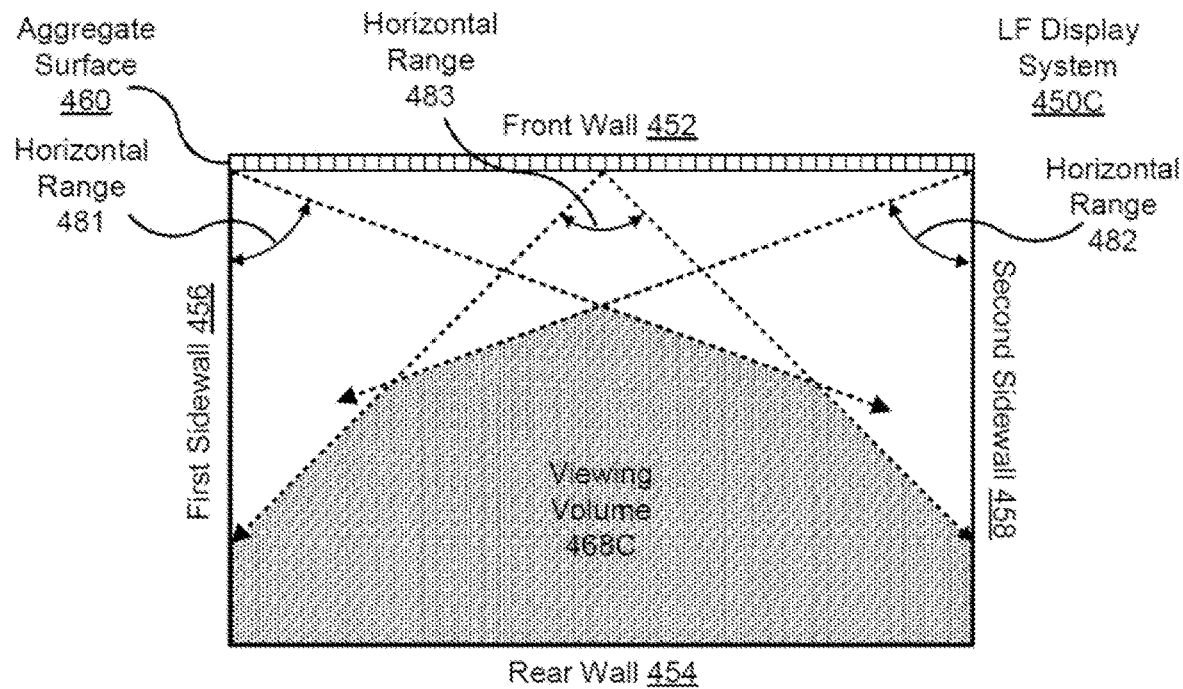
FIG. 4E is a top-down view of a light field display system with an aggregate surface on a front wall of a room, in accordance with one or more embodiments.

FIG. 4E, for example, illustrates a top down view of a LF display system 450C with an aggregate surface 460 on a front wall 452 of a room. In this example, the LF display system 450D is located in a room with a front wall 452, a rear wall 454, a first sidewall 456, a second sidewall 458, a ceiling (not shown), and a floor (not shown).

LF display system 450C projects various rays from the aggregate surface 460. From each position on the display surface, light rays are projected in an angular range that is centered on the viewing volume. The rays projected from the left side of the aggregate surface 460 have horizontal angular range 481, rays projected from the right side of the aggregate surface have horizontal angular range 482, and rays projected from the center of the aggregate surface 460 have horizontal angular range 483. Having a gradient deflection angle in the projected rays across the display surface in this manner creates a viewing volume 468C. Further, this configuration avoids wasting resolution of the display on projecting rays into the side walls 456 and 458.

Figure 4F:
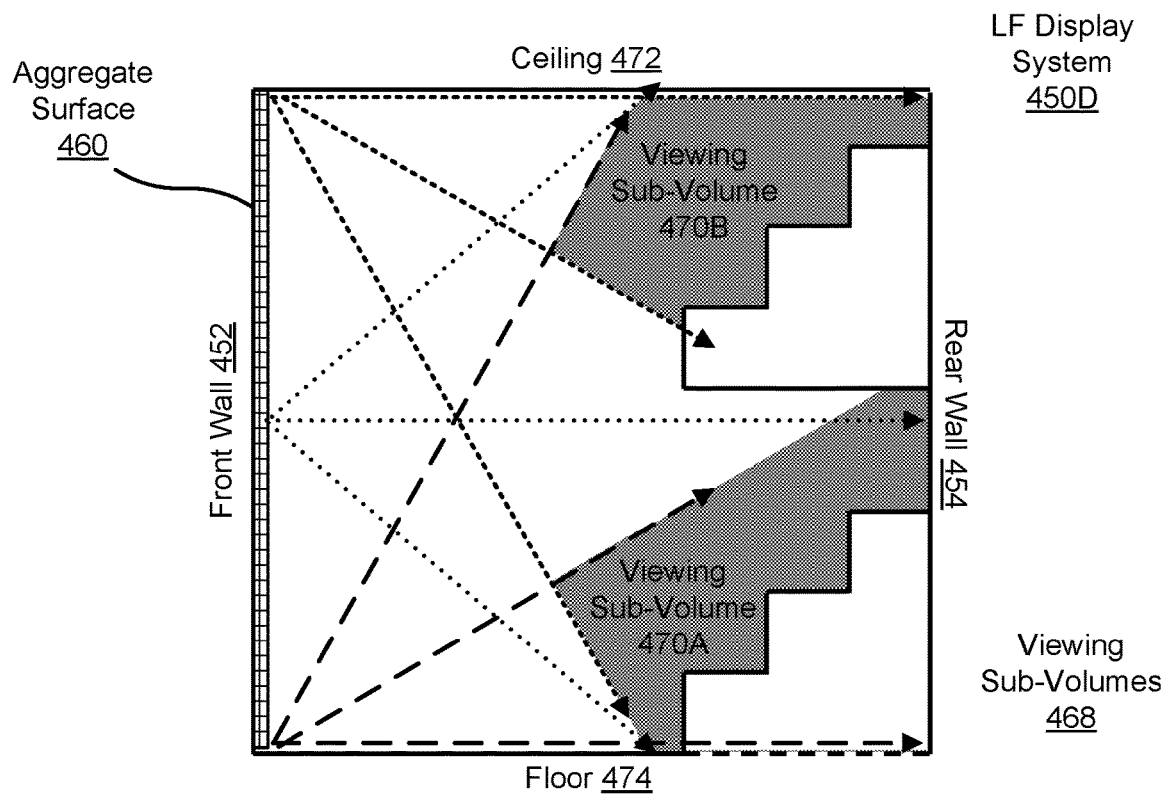
FIG. 4F is a side view of a side view of a LF display system with an aggregate surface on the front wall of the room, in accordance with one or more embodiments.

FIG. 4F illustrates a side view of a LF display system 450D with an aggregate surface 460 on a front wall 452 of a room. In this example, the LF display system 450E is located in a room with a front wall 452, a rear wall 454, a first sidewall (not shown), a second sidewall (not shown), a ceiling 472, and a floor 474. In this example, the floor is tiered such that each tier rises in steps moving from the front wall to the back wall. Here, each tier of the floor includes a viewing sub-volume (e.g., viewing sub volume 470A and 470B). A tiered floor allows for viewing sub-volumes that do not overlap. That is, each viewing sub-volume has a line of sight from the viewing sub-volume to the aggregate surface 460 that does not pass through another viewing sub-volume. In other words, this orientation produces a "stadium seating" effect in which the vertical offset between tiers allows an unobstructed line of sight which allows each tier to "see over" the viewing sub-volumes of other tiers. LF display systems including viewing sub-volumes that do not overlap may provide a higher quality viewing experience than LF display systems that have viewing volumes that do overlap. For example, in the configuration shown in FIG. 4F, different holographic content may be projected to the audiences in viewing sub-volumes 470A and 470B.

Control of a LF Display System

Figure 5:
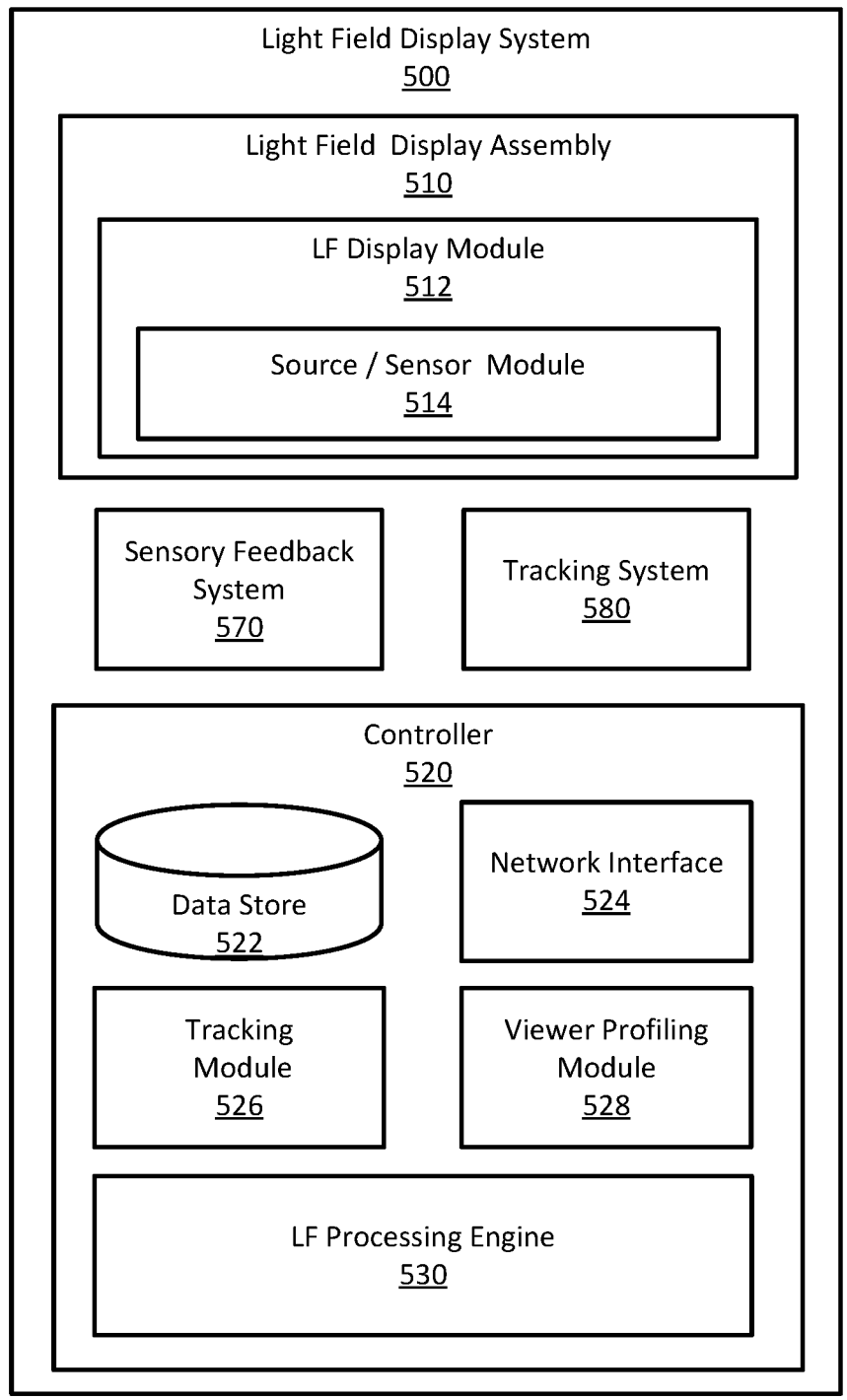
FIG. 5 is a block diagram of a light field display system, in accordance with one or more embodiments.

FIG. 5 is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a datastore 522, a network interface 524, and a LF processing engine 530. The controller 520 may also include a tracking module 526, and a viewer profiling module 528. In some embodiments, the LF display system 500 also includes a sensory feedback system 570 and a tracking system 580. The LF display systems described in the context of FIGS. 1, 2A, 2B, 3A, 3B, and 4A-F discuss embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6A-8B.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface the LF display assembly 510, behind the aggregate surface of the LF display assembly 510, or some combination thereof. Generating display instructions with the controller 520 is described in more detail below.

The LF display assembly 510 provides holographic content using one or more LF display modules (e.g., any of the LF display module 110, the LF display system 200, and LF display module 300) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a wall of an enclosure, a curved surface, etc.). That is, the tiled LF display modules form an aggregate surface. As previously described, a LF display module 512 includes an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, smell, temperature, etc.) using a sensory feedback system 570. The sensory feedback system 570 may augment the projection of holographic content by executing display instructions received from the controller 520. Generally, the sensory feedback system 570 includes any number of sensory feedback devices external to the LF display assembly 510 (e.g., sensory feedback system 442). Some example sensory feedback devices may include coordinated acoustic projecting and receiving devices, aroma projecting devices, temperature adjustment devices, force actuation devices, pressure sensors, transducers, some other sensory feedback devices, or some combination thereof. The sensory feedback includes tactile feedback (e.g., a touch), audio feedback (e.g., a sound), aroma feedback (e.g., a smell), temperature feedback (e.g., an exposure to cold or heat), some other type of sensory feedback, or any combination thereof. In some cases, the sensory feedback system 570 may have similar functionality to the light field display assembly 510 and vice versa. For example, both a sensory feedback system 570 and a light field display assembly 510 may be configured to generate a sound field. As another example, the sensory feedback system 570 may be configured to generate haptic surfaces while the light field display 510 assembly is not. The sensory feedback system 570 can be used in any LF display system in an amusement park (e.g., in an enclosure, in a user station, in a queue, etc.).

To illustrate, in an example embodiment of a light field display system 500, a sensory feedback system 570 may include one or more acoustic projection devices. The one or more acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 570 may include an aroma projecting device. The aroma projecting device may be configured to provide scents to some, or all, of the viewing volume (e.g., the enclosure of the amusement park ride, the queue at an amusement park, etc.) when executing display instructions received from the controller. The aroma devices may be tied into an air circulation system (e.g., ducting, fans, or vents) to coordinate air flow within the viewing volume. Further, the sensory feedback system 570 may include a temperature adjustment device. The temperature adjustment device is configured to increase or decrease temperature in some, or all, of the viewing volume when executing display instructions received from the controller 520.

In some embodiments, the sensory feedback system 570 is configured to receive input from viewers of the LF display system 500. In this case, the sensory feedback system 570 includes various sensory feedback devices for receiving input from viewers. The sensor feedback devices may include devices such as acoustic receiving devices (e.g., a microphone), pressure sensors, joysticks, motion detectors, transducers, etc. The sensory feedback system may transmit the detected input to the controller 520 to coordinate generating holographic content and/or sensory feedback.

To illustrate, in an example embodiment of a light field display assembly, a sensory feedback system 570 includes a microphone. The microphone is configured to record audio produced by one or more viewers (e.g., gasps, screams, laughter, etc.). The sensory feedback system 570 provides the recorded audio to the controller 520 as viewer input. The controller 520 may use the viewer input to generate holographic content. Similarly, the sensory feedback system 570 may include a pressure sensor. The pressure sensor is configured to measure forces applied by viewers to the pressure sensor. The sensory feedback system 570 may provide the measured forces to the controller 520 as viewer input.

In some embodiments, the LF display system 500 includes a tracking system 580. The tracking system 580 includes any number of tracking devices configured to obtain information of the one or more viewers in the viewing volume. The tracking module may obtain information about viewers including a position of the viewer (e.g., a viewer's location based on a reference point), a movement of the viewer (e.g., viewer walked from the left to the right), a gesture of the viewer (e.g., viewer raised their arms up over their head), a gaze of a viewer (e.g., a viewer looking at a holographic character's face), an expression of the viewer (e.g., viewer smiled), an age of the viewer (e.g., viewer is an adult), a gender of the viewer (e.g., viewer is female), an identification of some or all of a piece of a garment worn by the viewer (e.g., viewer is wearing a shirt with kittens on it), or an auditory feedback of the viewer (e.g., a command or a laugh of the viewer). The controller 520 (e.g., the LF processing engine 530) generates holographic content based on the obtained information gathered by the tracking system 580. Generally, the tracking devices are external to the LF display assembly 510. Some example tracking devices include a camera assembly ("camera"), a depth sensor, structured light, a LIDAR system, a card scanning system, or any other tracking device that can track viewers within a target area. The tracking system 580 can be used in any LF display system in an amusement park (e.g., in an enclosure, in a user station, in a queue, etc.).

The tracking system 580 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 580 may adjust one or more emission parameter when executing instructions received from the controller 520. An emission parameter is a parameter that affects how light is projected from a source of the tracking system 580. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The camera of the tracking system 580 captures images of the light (e.g., structured light pattern) reflected from the target area. The camera captures images when executing tracking instructions received from the controller 520. As previously described, the light may be projected by a source of the tracking system 580. The camera may include one or more cameras. That is, a camera may be, e.g., an array (1D or 2D) of photodiodes, a CCD sensor, a CMOS sensor, some other device that detects some or all of the light project by the tracking system 580, or some combination thereof. In an embodiment, the tracking system 580 may contain a light field camera external to the LF display assembly 510. In other embodiments, the cameras are included as part of the LF display source/sensor module 514 included in the LF display assembly 510. For example, as previously described, if the energy relay element of a light field module 512 is a bidirectional energy layer which interleaves both emissive displays and imaging sensors at the energy device layer 220, the LF display assembly 510 can be configured to simultaneously project light fields and record imaging information from the viewing area in front of the display. In one embodiment, the captured images from the bidirectional energy surface form a light field camera. The camera provides captured images to the controller 520.

The camera of the tracking system 580 may adjust one or more imaging parameters when executing tracking instructions received from the controller 520. An imaging parameter is a parameter that affects how the camera captures images. An imaging parameter may include, e.g., frame rate, aperture, gain, exposure length, frame timing, rolling shutter or global shutter capture modes, some other parameter that affects how the camera captures images, or some combination thereof.

The controller 520 controls the LF display assembly 510 and any other components of the LF display system 500. The controller 520 comprises a data store 522, a network interface 524, a tracking module 526, a viewer profiling module 528, and a light field processing engine 530. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 580.

The data store 522 is a memory that stores information for the LF display system 500. The stored information may include display instructions, tracking instructions, emission parameters, imaging parameters, a virtual model of a target area, tracking information, images captured by the camera, one or more viewer profiles, calibration data for the light field display assembly 510, configuration data for the LF display system 510 including resolution and orientation of LF modules 512, desired viewing volume geometry, content for graphics creation including 3D models, scenes and environments, materials and textures, other information that may be used by the LF display system 500, or some combination thereof. The data store 522 is a memory, such as a read only memory (ROM), dynamic random access memory (DRAM), static random access memory (SRAM), some other type of memory, or some combination thereof.

The network interface 524 allows the light field display system to communicate with other systems or environments via a network. In one example, the LF display system 500 receives holographic content from a remote light field display system via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 580, and provides the tracking instructions to the tracking system 580. The tracking system 580 executes the tracking instructions and provides tracking input to the tracking module 526.

The tracking module 526 may determine a position of one or more viewers within the target area. The determined position may be relative to, e.g., some reference point (e.g., a display surface). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 580. The cameras of the tracking system 580 may be distributed about the LF display system 500, and can capture images in stereo, allowing for the tracking module 526 to passively track viewers. In other embodiments, the tracking module 526 actively tracks viewers. That is, the tracking system 580 illuminates some portion of the target area, images the target area, and the tracking module 526 uses time of flight and/or structured light depth determination techniques to determine position. The tracking module 526 generates tracking information using the determined positions.

The tracking module 526 may also receive tracking information as inputs from viewers of the LF display system 500. The tracking information may include body movements that correspond to various input options that the viewer is provided by the LF display system 500. For example, the tracking module 526 may track a viewer's body movement and/or gesture and assign any various movement as an input to the LF processing engine 530. The tracking module 526 may provide the tracking information to the data store 522, the LF processing engine 530, the viewer profiling module 528, any other component of the LF display system 500, or some combination thereof.

To provide context for the tracking module 526, consider an example embodiment of an LF display system 500 that displays a holographic character from an amusement park ride defeating a holographic enemy character. For this example, the holographic character is the hero in the amusement park ride's storyline. In response to the display, a viewer first pumps the air to show their excitement. The tracking system 580 may record the movement of the viewer's hands and transmit the recording to the tracking module 526. This may be achieved with a tracking system 580 comprised of cameras, depth sensors, or other devices that are external to the light field display assembly 510, or with a display surface which simultaneously projects light field images and records images, wherein the images recorded from the display surface may be light field images, or any combination of these devices, as previously described. The tracking module 526 tracks the motion of the viewer's hands in the recording and sends the input to LF processing engine 530. The viewer profiling module 528, as described below, determines that information in the image indicates that motion of the viewer's hands is associated with a positive response. Accordingly, if enough viewers are recognized having a positive response, the LF processing engine 530 generates appropriate holographic content to celebrate the hero character's defeat over the enemy character. For example, the LF processing engine 530 may project confetti in the scene.

The LF display system 500 includes a viewer profiling module 528 configured to access the information obtained by the tracking system 580, process the information to identify a viewer of the one or more viewers, and generate a viewer profile for the viewer (or viewers). The viewer profiling module 528 generates a profile of a viewer (or viewers) that views holographic content displayed by a LF display system 500. The viewer profiling module 528 generates a viewer profile based, in part, on viewer input and monitored viewer behavior, actions, and reactions. The viewer profiling module 528 can access information obtained from tracking system 580 (e.g., recorded images, videos, sound, etc.) and process that information to determine various information. The controller 520 (e.g., the LF processing engine 530) generates holographic content based in part on the generated viewer profile (or viewer profiles) by the viewer profiling module 528. In various examples, viewer profiling module 528 can use any number of machine vision or machine hearing algorithms to determine viewer behavior, actions, and reactions. The viewer profiling module 528 can be used in any LF display system in an amusement park (e.g., in an enclosure, in a user station, in a queue, etc.).

More generally, a viewer profile may include any information received and/or determined about a viewer viewing holographic content from the LF display system. For example, each viewer profile may log actions or responses of that viewer to the content displayed by the LF display system 500. Additionally, the LF processing engine may create an interactive experience by generating additional holographic and/or sensory content for display to the viewers based on the viewer profile. Some example information that can be included in a viewer profile are provided below.

In some embodiments, the viewer profiling module 528 monitors behavior of the viewers within, e.g., the amusement park. Monitored behavior may include, e.g., number of times a viewer participates in an amusement park ride, how long the viewer is willing to wait in line for a particular amusement park ride, how the viewer responds to certain types of holographic content (e.g., in a haunted house—what elicits the loudest scream from a user), some other behavior relating to the amusement park ride, or some combination thereof. In some embodiments, the viewing profile may describe behavior for the viewer in the context of the entire amusement park and/or other amusement parks.

In another example, monitored viewer behavior can include, for example, smiles, cheering, clapping, laughing, fright, screams, excitement levels, recoiling, other changes in gestures, or movement by the viewers, etc. In some embodiments, the viewer profiling module 528 may directly update a viewer profile based on actions and/or responses of a viewer to holographic content displayed by the LF display system 500. In some embodiments, a viewer profile may describe a response of a viewer with respect to a displayed holographic character (e.g., an actor, an animation, etc.), enclosure (e.g., car, room, etc.), etc. For example, a viewer profile may indicate that a viewer generally has a positive response to holographic characters.

In some embodiments, a viewer profile can indicate characteristics of a viewer at an amusement park. For example, a viewer in a queue for an amusement park ride is wearing a sweatshirt displaying a character associated with that amusement park. In this case, the viewer profile can indicate that the viewer is wearing a sweatshirt and may prefer holographic content associated with the character who is on the sweatshirt. More broadly, viewer characteristics that can be indicated in a viewer profile may include, for example, age, gender, ethnicity, clothing, etc.

In some embodiments, a viewer profile can indicate preferences for a viewer in regard to desirable amusement park ride experiences and/or amusement park ride enclosure characteristics. For example, a viewer profile may indicate that a viewer prefers only to view holographic content that is age appropriate for everyone in their family. In another example, a viewer profile may indicate holographic object volumes to display holographic content (e.g., on a wall) and holographic object volumes to not display holographic content (e.g., above their head). The viewer profile may also indicate that the viewer prefers to have haptic interfaces presented near them, or prefers to avoid them.

In another example, a viewer profile indicates subsequent visits for an amusement park ride by a particular viewer. For instance, viewer profiling module 528 determines that a viewer, or group of viewers, has previously attended the amusement park ride. As such the LF display system 500 may display holographic content that is different than the previous time the viewers attended the amusement park ride. As one example, an amusement park ride including holographic content may have three different endings and LF display system 500 may display different endings based on the viewers in attendance. In another example, each of the three endings may be presented to different viewing volumes in the same amusement park ride enclosure.

In some embodiments, a viewer profile may also describe characteristics and preferences for a group of viewers rather than a particular viewer. For example, viewer profiling module 528 may generate a viewer profile for the riders of an amusement park ride. In one example, viewer profiling module 528 creates a viewer profile for riders of an amusement park ride that involves fairy princesses. The profile indicates that 60.3% of the viewers are young girls between the age of 2 and 12 and have a positive response to the amusement park ride. The profile also indicates that the remaining 39.7% of the viewers are adults and young boys and are having a negative reaction to the amusement park ride. Any of the previously described information and characteristics may be applied to a group of viewers.

The viewer profiling module 528 may also access a profile associated with a particular viewer (or viewers) from a third-party system or systems to build and/or update a viewer profile. The viewer profiling module 528 may be configured to update the viewer profile using information from a social media account of the viewer (or viewers). The controller 520 (e.g., the LF processing engine 530) generates holographic content based in part on the updated viewer profile (or updated viewer profiles). For example, a viewer purchases a ticket for an amusement park using a third-party vendor that is linked to that viewer's social media account. Thus, the viewer's ticket is linked to his social media account. When the viewer enters the amusement park using their ticket, the viewer profiling module 528 can access information from his social media account to build (or augment) a viewer profile.

In some embodiments, the data store 522 includes a viewer profile store that stores viewer profiles generated, updated, and/or maintained by the viewer profiling module 528. The viewer profile can be updated in the data store at any time by the viewer profiling module 528. For example, in an embodiment, the viewer profile store receives and stores information regarding a particular viewer in their viewer profile when the particular viewer views holographic content provided by the LF display system 500. In this example, the viewer profiling module 528 includes a facial recognition algorithm that may recognize viewers and positively identify them as they view presented holographic content. To illustrate, as a viewer enters the target area of the LF display system 500, the tracking system 580 obtains an image of the viewer. The viewer profiling module 528 inputs the captured image and identifies the viewer's face using the facial recognition algorithm. The identified face is associated with a viewer profile in the profile store and, as such, all input information obtained about that viewer may be stored in their profile. The viewer profiling module may also utilize card identification scanners, voice identifiers, a radio-frequency identification (RFID) chip scanners, barcode scanners, etc. to positively identify a viewer. In one example, viewers may be given a barcode on a wristband. Paired with a barcode scanner, the viewer profiling module may positively identify the viewer waiting in the queue. In another example, viewers may be given a RFID chip that can then be scanned with a RFID scanner to positively identify the viewer waiting in the queue.

In embodiments where the viewer profiling module 528 can positively identify viewers, the viewer profiling module 528 can determine each visit of each viewer to the LF display system 500. The viewer profiling module 528 may then store the time and date of each visit in the viewer profile for each viewer. Similarly, the viewer profiling module 528 may store received inputs from a viewer from any combination of the sensory feedback system 570, the tracking system 580, and/or the LF display assembly 510 each time they occur. Viewer information that can be recorded with the viewer profiling module 528 may include each visit to the amusement park (e.g., including time/date or duration of visit), in-park purchases (e.g., price of purchases or items purchased), number of visits to various rides in the amusement park (e.g., which ride is most visited), wait times during each visit, frequency between visits to one ride in the amusement park, etc. In some embodiments, an amusement park may also have tiers of viewers (e.g., regular, season pass holder, or very important person (VIP)). In these embodiments, the tracking system may positively identify the viewer. Once the tracking system accesses the viewer profile store, the LF display system 500 may determine that viewer's status (e.g., as regular, season pass holder, or VIP) and could provide holographic content specific to that viewer's status. The viewer profile store may additionally receive further information for a viewer from other modules or components of the controller 520 which can then be stored with the viewer profile. Other components of the controller 520 may then also access the stored viewer profiles for determining subsequent holographic content to be provided to that viewer. The viewer profiling module 528 may additionally receive further information about a viewer from other modules or components of the controller 520 which can then be stored with the viewer profile. Other components of the controller 520 may then also access the stored viewer profiles for determining subsequent holographic content to be provided to that viewer.

The LF processing engine 530 generates holographic content comprised of light field data, as well as data for all of the sensory domains supported by a LF display system 500. For example, LF processing engine 530 may generate 4D coordinates in a rasterized format ("rasterized data") that, when executed by the LF display assembly 510, cause the LF display assembly 510 to present holographic content. The LF processing engine 530 may access the rasterized data from the data store 522. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522. In aggregate, the 4D coordinates and sensory data represent holographic content as display instructions executable by a LF display system to generate holographic and sensory content. More generally, holographic content can take the form of CG content with ideal light field coordinates, live action content, rasterized data, vectorized data, electromagnetic energy transported by a set of relays, instructions sent to a group of energy devices, energy locations on one or more energy surfaces, the set of energy propagation paths that are projected from the display surface, a holographic object that is visible to a viewer or an audience, and many other similar forms.

The LF display system 500 may also generate an interactive viewing experience. That is, holographic content may be responsive to input stimuli containing information about viewer locations, gestures, interactions, interactions with holographic content, or other information derived from the tracking module 526 and/or viewer profiling module 528. For example, if a holographic object needs to move in a certain direction immediately in response to a viewer interaction, the LF processing engine 530 may update the render of the scene so the holographic object moves in that required direction. This may require the LF processing engine 530 to render light fields in real time based on a 3D graphical scene with the proper object placement and movement, collision detection, occlusion, color, shading, lighting, etc., correctly responding to the viewer interaction.

The LF display assembly 510 simultaneously projects holographic and sensory content of the amusement park ride experience by executing the display instructions. The LF display system 500 monitors viewer interactions (e.g., vocal response, touching, etc.) with the presented amusement park ride content with the tracking module 526 and viewer profiling module 528. In response to the viewer interactions, the LF processing engine may create an interactive experience by generating additional holographic and/or sensory content for display to the viewers.

To illustrate, consider an example embodiment of an LF display system 500 including a LF processing engine 530 that generates a plurality of holographic objects representing balloons falling from the ceiling during an amusement park ride. A viewer may move to touch the holographic object representing the balloon. Correspondingly, the tracking system 580 tracks movement of the viewer's hands relative to the holographic object. The movement of the viewer is recorded by the tracking system 580 and sent to the controller 520. The tracking module 526 continuously determines the motion of the viewer's hand and sends the determined motions to the LF processing engine 530. The LF processing engine 530 determines the placement of the viewer's hand in the scene, adjusts the real-time rendering of the graphics to include any required change in the holographic object (such as position, color, or occlusion). The LF processing engine 530 instructs the LF display assembly 510 (and/or sensory feedback system 570) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the viewer is given both a visual and tactile perception of touching the balloon. More simply, when a viewer views his hand touching a holographic balloon, the viewer simultaneously feels haptic feedback indicating their hand touches the holographic balloon, and the balloon changes position or motion in response to the touch.

LF processing engine 530 may provide holographic content to display to viewers in a queue before, during, and/or after an amusement park ride to augment the amusement park ride experience. The holographic content may be provided by the publisher of the characters involved in the amusement park ride, provided by the amusement park, provided by an advertiser, generated by a LF processing engine 530, etc. The holographic content may be content associated with the amusement park ride, the genre of the amusement park ride, the location of the amusement park, advertisements, etc. In any case, the holographic content may be stored in the data store 522, or streamed to the LF display system 500 through the network interface 524. For example, viewers of an amusement park ride may have to wait in a queue before experiencing the ride. The queue is augmented with LF display modules. The publisher of the characters involved in the amusement park ride may provide holographic content to present on the queue displays before the amusement park ride begins. The LF processing engine 530 accesses the holographic content and presents the accessed content from the displays in the queue before the amusement park ride begins. In another example, an advertiser has provided holographic content of its products as advertisements to an amusement park to display to viewers in amusement park ride queues. The LF processing engine 530 presents the advertisements to the viewers in the queue. In other examples, as described below, a LF processing engine may dynamically generate holographic content to display in the queues or during the amusement park rides.

The LF processing engine 500 may also modify holographic content to suit the enclosure that is presenting the holographic content. For example, not every enclosure is the same size, has the same number of seats, or has the same technical configuration. As such, LF processing engine 530 may modify holographic content such that it will be appropriately displayed in an enclosure. In an embodiment, the LF processing engine 530 may access a configuration file of an enclosure including the layout, resolution, field-of-view, other technical specifications, etc. of the enclosure. The LF processing engine 530 may render and present the holographic content based on information included in the configuration file.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 can use information from the tracking system 580, the sensory feedback system 570, the viewer profiling module 528, the tracking module 526, or some combination thereof, to create holographic content for display. In some examples, LF processing engine 530 may access information from elements of the LF display system 500 (e.g., tracking information and/or a viewer profile), create holographic content based on that information, and display the created holographic content using the LF display system 500 in response. The created holographic content may be augmented with other sensory content (e.g., touch, audio, or smell) when displayed by the LF display system 500. Further, the LF display system 500 may store created holographic content such that it may be displayed in the future.

Dynamic Content Generation for a LF Display System

In some embodiments, the controller 520 (e.g., the LF processing engine 530) incorporates an artificial intelligence (AI) model to create holographic content for display by the LF display system 500. The controller 520 may use information obtained by the tracking system 580 and/or the viewer profiling module 528, including updated viewer profiles, and an AI model to generate holographic content. The AI model may include supervised or unsupervised learning algorithms including but not limited to regression models, neural networks, classifiers, or any other AI algorithm. The AI model may be used to determine viewer preferences based on viewer information recorded by the LF display system 500 (e.g., by tracking system 580) which may include information on a viewer's behavior.

The AI model may access information from the data store 522 to create holographic content. For example, the AI model may access viewer information from a viewer profile or profiles in the data store 522 or may receive viewer information from the various components of the LF display system 500. To illustrate, the AI model may determine a viewer enjoys seeing holographic content including animals.

The AI model may determine the preference based on a group of viewer's positive reactions or responses to previously viewed holographic content including animals. That is, the AI model may create holographic content personalized to a set of viewers according to the learned preferences of those viewers. So, for example, the AI model may incorporate animals in the holographic content viewed by a group of viewers using the LF display system 500. The AI model may also store the learned preferences of each viewer in the viewer profile store of the data store 522. In some examples, the AI model may create holographic content for an individual viewer rather than a group of viewers.

One example of an AI model that can be used to identify characteristics of viewers, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. For example, and AI model may include five layers of nodes: layers A, B, C, D, and E. The transformation from layer A to layer B is given by a function $W_1$, the transformation from layer B to layer C is given by $W_2$, the transformation from layer C to layer D is given by $W_3$, and the transformation from layer D to layer E is given by $W_4$. In some examples, the transformation can also be determined through a set of weights and parameters used to transform between previous layers in the model. For example, the transformation $W_4$ from layer D to layer E can be based on parameters used to accomplish the transformation $W_1$ from layer A to B.

The input to the model can be an image taken by tracking system 580 encoded onto the convolutional layer A and the output of the model is holographic content decoded from the output layer E. Alternatively or additionally, the output may be a determined characteristic of a viewer in the image. In this example, the AI model identifies latent information in the image representing viewer characteristics in the identification layer C. The AI model reduces the dimensionality of the convolutional layer A to that of the identification layer C to identify any characteristics, actions, responses, etc. in the image. In some examples, the AI model then increases the dimensionality of the identification layer C to generate holographic content.

The image from the tracking system 580 is encoded to a convolutional layer A. Images input in the convolutional layer A can be related to various characteristics and/or reaction information, etc. in the identification layer C. Relevance information between these elements can be retrieved by applying a set of transformations between the corresponding layers. That is, a convolutional layer A of an AI model represents an encoded image, and identification layer C of the model represents a smiling viewer. Smiling viewers in a given image may be identified by applying the transformations $W_1$ and $W_2$ to the pixel values of the image in the space of convolutional layer A. The weights and parameters for the transformations may indicate relationships between information contained in the image and the identification of a smiling viewer. For example, the weights and parameters can be a quantization of shapes, colors, sizes, etc. included in information representing a smiling viewer in an image. The weights and parameters may be based on historical data (e.g., previously tracked viewers).

Smiling viewers in the image are identified in the identification layer C. The identification layer C represents identified smiling viewers based on the latent information about smiling viewers in the image.

Identified smiling viewers in an image can be used to generate holographic content. To generate holographic content, the AI model starts at the identification layer C and applies the transformations $W_2$ and $W_3$ to the value of the given identified smiling viewers in the identification layer C. The transformations result in a set of nodes in the output layer E. The weights and parameters for the transformations may indicate relationships between an identified smiling viewers and specific holographic content and/or preferences. In some cases, the holographic content is directly output from the nodes of the output layer E, while in other cases the content generation system decodes the nodes of the output layer E into a holographic content. For example, if the output is a set of identified characteristics, the LF processing engine can use the characteristics to generate holographic content.

Additionally, the AI model can include layers known as intermediate layers. Intermediate layers are those that do not correspond to an image, identifying characteristics/reactions, etc., or generating holographic content. For example, in the given example, layer B is an intermediate layer between the convolutional layer A and the identification layer C. Layer D is an intermediate layer between the identification layer C and the output layer E. Hidden layers are latent representations of different aspects of identification that are not observed in the data, but may govern the relationships between the elements of an image when identifying characteristics and generating holographic content. For example, a node in the hidden layer may have strong connections (e.g., large weight values) to input values and identification values that share the commonality of "laughing people smile." As another example, another node in the hidden layer may have strong connections to input values and identification values that share the commonality of "scared people scream." Of course, any number of linkages are present in a neural network. Additionally, each intermediate layer is a combination of functions such as, for example, residual blocks, convolutional layers, pooling operations, skip connections, concatenations, etc. Any number of intermediate layers B can function to reduce the convolutional layer to the identification layer and any number of intermediate layers D can function to increase the identification layer to the output layer.

In one embodiment, the AI model includes deterministic methods that have been trained with reinforcement learning (thereby creating a reinforcement learning model). The model is trained to increase the quality of the amusement park ride using measurements from tracking system 580 and/or viewer profiling module 528 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told which actions to take (e.g., generating prescribed holographic content), but instead discovers which actions yield the most reward (e.g., increasing the quality of holographic content by making more people cheer) by trying them. In some cases, actions may affect not only the immediate reward but also the next situation and, through that, all subsequent rewards. These two characteristics—trial-and-error search and delayed reward—are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of generating a scene for a holographic character, the reinforcement learning system captures information about viewers on the amusement park ride (e.g., age, disposition, etc.). Such an agent senses the state of the environment and takes actions that affect the state to achieve a goal or goals (e.g., creating a scene for which the viewers will cheer). In its most basic form, the formulation of reinforcement learning includes three aspects for the learner: sensation, action, and goal. The LF processing engine 530 senses the state of the environment with sensors of the tracking system 580, displays holographic content to the viewers in the environment, and achieves a goal that is a measure of the viewer's reception of that scene.

One of the challenges that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that it has not selected before. The agent 'exploits' information that it already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate to its expected reward. For example, if the LF processing engine creates holographic content that the LF processing engine knows will result in a viewer laughing after a long period of time, the LF processing engine may change the holographic content such that the time until a viewer laughs decreases.

Further, reinforcement learning considers the whole problem of a goal-directed agent interacting with an uncertain environment. Reinforcement learning agents have explicit goals, can sense aspects of their environments, and can choose actions to receive high rewards (i.e., a roaring crowd). Moreover, agents generally operate despite significant uncertainty about the environment they face. When reinforcement learning involves planning, the system addresses the interplay between planning and real-time action selection, as well as the question of how environmental elements are acquired and improved. For reinforcement learning to make progress, important sub problems have to be isolated and studied, the sub problems playing clear roles in complete, interactive, goal-seeking agents.

The reinforcement learning problem is a framing of a machine learning problem where interactions are processed and actions are carried out to achieve a goal. The learner and decision-maker is called the agent (e.g., LF processing engine 530). The thing it interacts with, comprising everything outside the agent, is called the environment (e.g., riders on an amusement park ride, etc.). These two interact continually, the agent selecting actions (e.g., creating holographic content) and the environment responding to those actions and presenting new situations to the agent. The environment also gives rise to rewards, special numerical values that the agent tries to maximize over time. In one context, the rewards act to maximize viewer positive reactions to holographic content. A complete specification of an environment defines a task which is one instance of the reinforcement learning problem.

To provide more context, an agent (e.g., LF processing engine 530) and environment interact at each of a sequence of discrete time steps, i.e. t=0, 1, 2, 3, etc. At each time step t the agent receives some representation of the environment's state $s_t$ (e.g., measurements from tracking system 580). The states $s_t$ are within S, where S is the set of possible states. Based on the state $s_t$ and the time step t, the agent selects an action at (e.g., making the holographic character do the splits). The action at is within $A(s_t)$, where $A(s_t)$ is the set of possible actions. One time state later, in part as a consequence of its action, the agent receives a numerical reward $r_{t+1}$. The states $r_{t+1}$ are within R, where R is the set of possible rewards. Once the agent receives the reward, the agent selects in a new state $s_{t+1}$.

At each time step, the agent implements a mapping from states to probabilities of selecting each possible action. This mapping is called the agent's policy and is denoted $\pi_t$ where $\pi_t(s,a)$ is the probability that $a_t=a$ if $s_t=s$. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g. generating holographic content). The framework proposes that whatever the details of the sensory, memory, and control apparatus, any problem (or objective) of learning goal-directed behavior can be reduced to three signals passing back and forth between an agent and its environment: one signal to represent the choices made by the agent (the actions), one signal to represent the basis on which the choices are made (the states), and one signal to define the agent's goal (the rewards).

Of course, the AI model can include any number of machine learning algorithms. Some other AI models that can be employed are linear and/or logistic regression, classification and regression trees, k-means clustering, vector quantization, etc. Whatever the case, generally, the LF processing engine 530 takes an input from the tracking module 526 and/or viewer profiling module 528 and a machine learning model creates holographic content in response. Similarly, the AI model may direct the rendering of holographic content.

In an example, the LF processing engine 530 presents holographic content that includes a holographic character. The sensory feedback system 570 may comprise at least one sensory feedback device that is configured to provide sensory feedback as the holographic character is presented. The sensory feedback includes tactile feedback, audio feedback, aroma feedback, temperature feedback, any other type of sensory feedback, or any combination thereof. The sensory feedback system 570 may provide tactile feedback by providing a tactile surface coincident with a surface of the holographic character that the one or more viewers may interact with via touch. The tracking system 580 comprises one or more tracking devices configured to obtain information about the one or more viewers, and the controller 520 (e.g., the LF processing engine 530) may be configured to generate the holographic character for the one or more viewers of the amusement park ride based on the information obtained by the tracking system 580. Information obtained by the tracking system 580 includes any of a position of the viewer, a movement of the viewer, a gesture of the viewer, an expression of the viewer, a gaze of the viewer (i.e., gaze direction), an age of a viewer, a gender of the viewer, an identification of a piece of a garment worn by the viewer, and an auditory feedback of the viewer. In some embodiments, the tracked information includes the gaze of the viewer, and the controller 520 (e.g., the LF processing engine 530) is configured to update eyes of the holographic character to maintain eye-contact with the gaze of the viewer. In some embodiments, the tracked information includes the respective gazes of a plurality of viewers, the controller 520 (e.g., the LF processing engine 530) and configured to update eyes of the holographic character to alternate directing eye-contact between the plurality of viewers. The controller 520 (e.g., the LF processing engine 530) is configured to use the information obtained by the tracking system 580 and an AI model to generate holographic content.

The LF processing engine 530 may create the holographic character using information included in the viewer profiles stored in the data store 522. The viewer profiling module 528 is configured to access the information obtained by the tracking system 580, process the information to identify a viewer of the one or more viewers of the amusement park ride, and generate a viewer profile for the viewer. The controller 520 (e.g., the LF processing engine 530) may be configured to generate the holographic character for the viewer based in part on the viewer profile. For example, information included in stored viewer profiles indicates that a large number of viewers enjoy scenes involving animals and particularly enjoy scenes involving dogs. As such, the LF processing engine 530 creates a holographic character that is displayed by the LF display system 500 as a big, fluffy white dog. More explicitly, LF processing engine 530 accesses the viewer profiles of the viewers in an amusement park ride enclosure. LF processing engine 530 parameterizes (e.g., quantifies) information in each viewer profile. For example, LF processing engine 530 can quantify characteristics such as the age, location, gender, etc. of a viewer. Further, LF processing engine 530 can parameterize other information included in a viewer profile. The viewer profiling module 528 may be further configured to update the viewer profile using information from a social media account of the viewer and the controller 520 (e.g., the LF processing engine 530) is configured to generate the holographic character based in part on the updated viewer profile. For example, if a viewer profile indicates that a viewer has posted pictures of dogs to their social media and discussed supporting animal shelters and pet adoptions on their social media, the content creation module may quantify this tendency (e.g., generates a score indicating a viewer's interest in dogs). The controller 520 (e.g., the LF processing engine 530) is configured to use the viewer profile (an updated viewer profile) and an AI model to generate holographic content. For example, the parameterized user profiles are input into an AI model (e.g., a neural network) configured to generate characteristics of a holographic character based on input parameters and receives characteristics for the holographic character in response. LF processing engine 530 then inputs the characteristics for the holographic character into an AI model (e.g., a procedural generation algorithm) configured to generate a holographic character given a set of characteristics and generates a holographic dog that is big, fluffy, and white in response. Further the LF processing engine 530 can create holographic content (e.g., scenarios for, friends of, etc.) that would adhere to the persona of the holographic dog. For example, the content generation module 530 may create a scenario for the holographic dog about looking for a hidden dog bone. More explicitly, LF processing engine 530 may access the characteristics of the holographic dog and information about the viewers and input that information into an AI model (e.g., a recurrent neural network "RNN"). Again, the characteristics and information may be parameterized (e.g., using a classification and regression tree) and input into the RNN. Here, the RNN may be trained using real-world dogs with similar input parameters. As such, the RNN generates behaviors for the holographic dog, such as air-scenting, panting, tail wagging, etc., to the viewers in an amusement park ride enclosure that share similar characteristics to behaviors of real-world dogs.

LF processing engine 530 can create holographic content based on the theme of the amusement park ride. For example, the theme of the amusement park ride may be associated with a set of metadata describing the amusement park ride's characteristics. The metadata may include, for example, the setting, genre, characters, content, themes, titles, etc. LF processing engine 530 may access any of the metadata describing the amusement park ride and generate holographic content to present in the queue for the amusement park ride in response. For example, an outer space themed amusement park ride has a queue augmented with a LF display system 500. The LF processing engine 530 accesses the metadata of the amusement park ride to create holographic content for the queue before the amusement park ride begins. Here, the metadata includes that the setting is outer space and the genre is adventure. The LF processing engine 530 inputs the metadata into an AI model and receives holographic content to display on the LF display modules of the queue in response. In this example, the LF processing engine 530 creates a star and planet filled sky to display on the LF display modules of the queue before the amusement park ride.

In an example, the LF processing engine 530 creates holographic content based on the viewers present at the amusement park ride including a LF display system 500. For example, a group of viewers enters an enclosure of an amusement park ride augmented by holographic content displayed by the LF display system 500. Viewer profiling module 528 generates viewer profiles for the viewers in the enclosure of the amusement park ride and an aggregate viewer profile representing all of the viewers in the enclosure. The viewer profiling module 528 is configured to access the information obtained by the tracking system 580, process the information to identify the one or more viewers of the amusement park ride, and generate an aggregate viewer profile for the one or more viewers. The controller 520 (e.g., the LF processing engine 530) is configured to generate the holographic content for the one or more viewers based in part on the aggregate viewer profile. The viewer profiling module 528 is further configured to update the aggregate viewer profile using information from at least one or more social media accounts of the one or more viewers and the controller 520 (e.g., the LF processing engine 530) is further configured to generate holographic content based in part on the updated aggregate viewer profile. The aggregate viewer profile is a profile that includes information (e.g., an aggregate of viewer characteristics, an aggregate of viewer demographics, etc.) from one or more viewers social media accounts. LF processing engine 530 accesses the aggregate viewer profile and creates holographic content to display to the viewers in the enclosure. For example, the viewers in the enclosure are families with young children, and, therefore, the aggregate viewer profile includes information indicating that they may enjoy holographic content commensurate of families with young children (e.g., through parameterization and input into an AI model). As such, the LF processing engine 530 generates holographic content such that the enclosure has a more bright and cheerful atmosphere (e.g., colorful, bright lighting, animations, upbeat music, etc.).

In an example, the LF processing engine 530 creates holographic content based on the responses of viewers during an amusement park ride. For example, viewers in an enclosure of the amusement park ride are viewing content augmented by a LF display system 500. The tracking module 526 and the viewer profiling module 528 monitor the reaction of the viewers during the amusement park ride. For example, tracking module 526 may obtain images of viewers as they view content of the amusement park ride. Tracking module 526 identifies the viewer, and viewer profiling module 528 may use machine vision algorithms to determine a reaction of the viewer based on information included in the image. For example, an AI model can be used to identify if a viewer viewing the content of the amusement park ride is smiling and, accordingly, viewer profiling module 528 can indicate in the viewer profile if the viewer has a positive or negative response to the content based on the smile. Other reactions may also be determined. The tracking module may determine information about viewers including the position of the viewer, a movement of the viewer, a gesture of the viewer, an expression of the viewer, an age of the viewer, a gender of the viewer, an identification of a some or all of a piece of a garment worn by the viewer (e.g., a hoodie with a university logo on it), or an auditory feedback of the viewer (e.g., a laughing response of the viewer). This information may be shared with the viewer profiling module 528 to generate a viewer profile. By way of illustration, LF processing engine 530 generates scary content for a haunted house amusement park ride. As the LF display system 500 displays the scary content, the tracking system 580 and viewer profiling module 528 monitor the reactions of the viewers. In this instance, the viewers are not screaming at the ghost and goblin content being presented. In response, the LF processing engine 530 modifies the scary content such that the imagery becomes more graphic and the lighting darker. Here, LF processing engine 530 may input the reactions into an AI model (e.g., a reinforcement learning model) configured to induce screams in viewers viewing the holographic content. Based on the responses and characteristics of viewers on the amusement park ride, the LF processing engine 530 changes the approach to presenting scary content. Here, the model may be trained using previously presented scary content and recorded viewer responses to that content.

In a similar example, the LF processing engine 530 may create holographic content based on previously existing or provided advertisement content. That is, for example, the LF processing engine 530 can request an advertisement from a network system via network interface 524, the network system provides the holographic content in response, and the LF processing engine 530 creates holographic content for display including the advertisement. Some examples of advertisement can include, products, text, videos, etc. Advertisements may be presented to specific viewing volumes based on the viewers in that viewing volume. Similarly, holographic content may augment a queue for an amusement park ride with an advertisement (e.g., a product placement). Most generally, the LF processing engine 530 can create advertisement content based on any of the characteristics and/or reactions of the viewers in the queue as previously described.

The preceding examples of creating content are not limiting. Most broadly, LF processing engine 530 creates holographic content for display to viewers of a LF display system 500. The holographic content can be created based on any of the information included in the LF display system 500.

Amusement Park Examples

Figure 6A:
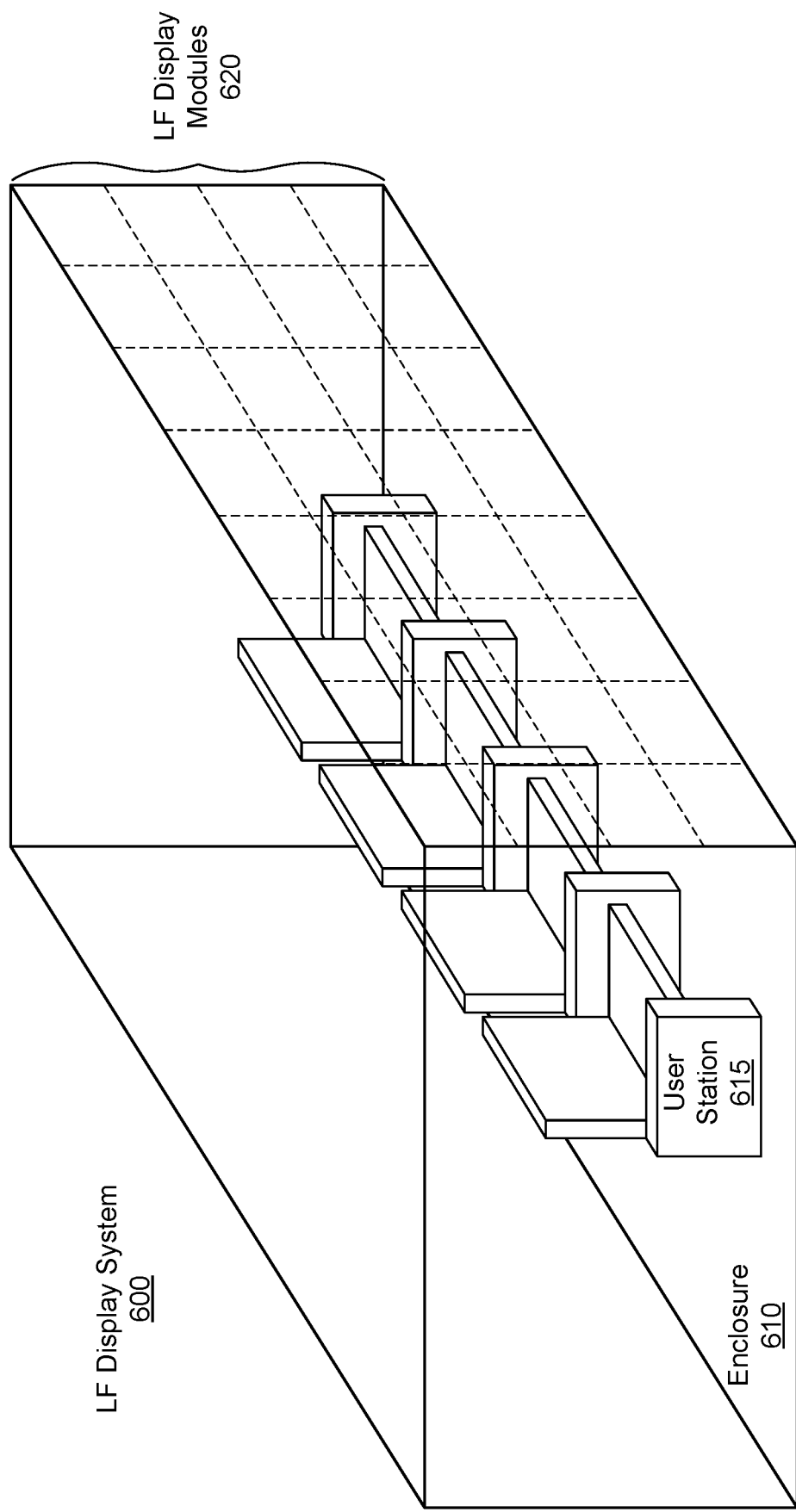
FIG. 6A is an illustration of a light field display system implemented as part of an amusement park ride presenting holographic content to one or more viewers, in accordance with one or more embodiments.

FIG. 6A is an illustration of a LF display system 600 implemented as part of an amusement park ride presenting holographic content to one or more viewers, in accordance to an embodiment. The LF display system 600 is an embodiment of the LF display system 500. The LF display system 600 contains an enclosure 610 with at least one LF display surface formed by a plurality of LF display modules 620. The enclosure 610 encloses the viewing volume for presenting holographic content to the one or more viewers. The plurality of LF display modules 620 are tiled together on one or more surfaces to form a seamless surface environment. In some embodiments, the plurality of LF display modules 620 are coincident to a wall, a floor, a ceiling, or some combination thereof (as illustrated in FIG. 4B). In one or more embodiments, the enclosure 610 comprises one or more user stations 615 that are configured to be occupied by one or more viewers (e.g., can seat one or more viewers of the amusement park ride). In some embodiments, the user station is configured to be occupied by the viewer and to move relative to the one or more LF display modules. The LF display system 600 is configured to generate holographic content based in part on relative movement between the user station and one or more LF display modules. In other embodiments, the user stations 615 move along a path within the enclosure 610. In other embodiments, the LF display assembly moves relative to the user station. The LF display system 600 also includes a LF display assembly (i.e., the LF display assembly 510) for generating holographic content to the viewers of the amusement park ride. The LF display system 600 may also include any combination of the other components of the LF display system 500 such as the sensory feedback system 570, the tracking system 580, and the controller 520.

The enclosure 610 of the LF display system 600 encloses a viewing volume for displaying holographic objects to one or more viewers. The viewing volume can have varying shapes and dimensions based in part on the design of the LF display system 600. In one embodiment, the enclosure 610 is a room that may comfortably fit one or more viewers standing or sitting. In another embodiment, the enclosure 610 may be sized as a user station with one or more physical objects for viewers to be seated. In some embodiment, the enclosure 610 is sized such that users may walk unconstrained around the enclosure 610 interacting with various holographic objects generated by the LF display assembly (i.e., the LF display assembly 510). The enclosure 610 may be determined by a plurality of walls that enclose the space of the enclosure 610. In the illustration of FIG. 6A, the enclosure 610 is a room with four walls with a floor and a ceiling. Note that in other embodiments, the geometry of the enclosure may be different (e.g., cylindrical or walls and ceiling form a dome). Of the surfaces that enclose the enclosure 610, at least one or more are configured as part of the LF display assembly as a multi-sided surface environment. In the illustration of FIG. 6A, although only one wall is shown with the LF display modules 620, in other embodiments, all walls, floor, and ceiling may contain LF display modules. The LF display modules 620 may form a multi-sided seamless surface environment (e.g., a six-sided seamless surface environment). The multi-sided surface environment includes LF display modules 620 for generating holographic content. In some embodiments, all surfaces of the enclosure 610 including the four walls, ceiling, and floor are integrated as part of the LF display assembly and configured as part of the six-sided seamless surface environment, (e.g., as illustrated in FIG. 4B). The six-sided seamless surface environment is advantageous, in that the viewers may freely gaze around the enclosure 610 while being fully immersed in holographic content. In one example, the LF display system 600 presents an outer space adventure for viewers. In this example the enclosure 610 may be sized to hold a crew of five or six viewers. In some additional embodiments, the enclosure 610 contains other physical objects that can be transformed with the LF display assembly. For example, the enclosure 610 comprises a dashboard display surface of the user station 615. The dashboard display surface comprises a LF display assembly which presents at least one holographic object such as a two-dimensional object, a three-dimensional object, a control button, a control switch, a control dial, a steering control interface, an instrument cluster, a volume control interface, a computer interface, a shifter, some other control interface, some other holographic object, or some combination thereof. Following the above example, the enclosure 610 of the outer space adventure may have a blank dashboard (not shown) that sits directly in front of the user stations 615 that can be transformed into a spaceship dashboard with the LF display assembly.

In some embodiments, the user stations 615 of the LF display system 600 are structures occupied by the viewers of the LF display system 600. For example, the LF display system 600 may alternatively use a chair (as illustrated in FIG. 6A), a bench, a stool, a cart, a carriage, a vehicle, a standing console, some other physical structure to be occupied by the viewers, or some combination thereof. In embodiments, the viewers may be unrestrained from moving freely in and out of the user stations 615 or may be restrained with a harness or safety belt throughout the ride.

In additional embodiments, the user stations 615 may be configured as part of a sensory feedback system (i.e., the sensory feedback system 570). The LF display system 600 may motorize the user stations 615 or portions of the enclosure 610 for adding movement (e.g., up to six degrees of freedom) of the user stations 615 during the amusement park ride. In some embodiments, the user stations 615 are configured to move and the one or more LF display modules 620 are stationary. The user stations 615 may be a motor-controlled chair, a motor-controlled bench, a motor-controlled stool, a motor-controlled cart, a carriage, a vehicle, a motor-controlled floor, a motor-controlled platform, some other motor-controlled physical structure to be occupied by the viewers, or some combination thereof. In other embodiments, the one or more LF display modules 620 are configured to move and the user stations 615 is stationary. In the outer space adventure example, the motor-controlled chairs may be used to, e.g., simulate acceleration and/or deceleration of the spaceship by rocking the chair backwards and forwards, respectively. The motor-controlled chairs may also shake the viewers to simulate an enemy ship firing at the spaceship causing damage to the spaceship. The LF display system 600 may further incorporate other sensor feedback devices into the user stations 615 to further immerse viewers in the amusement park ride. In some embodiments, the LF display system 600 incorporates some combination of audio feedback devices, temperature feedback devices, aroma feedback devices, tactile feedback devices, wind generators, some other feedback device, or some combination thereof in the user stations 615. The various sensory feedback devices may be components of the LF display assembly, an additional sensory feedback system (i.e., the sensory feedback system 570), or both. In the outer space adventure example, the sensory feedback devices may include speakers on the chairs for signaling an alarm due to an approaching unidentified spaceship or an enemy spaceship. The chairs may also be rigged with wind generators that can simulate a sprung leak on the spaceship.

The LF display assembly comprises the multi-sided surface environment consisting of LF display modules 620 to generate holographic content for the amusement park ride. Each LF display module of the LF display modules 620 that comprise the LF display assembly is an embodiment of the LF display module 110 and the LF display module 210. In one embodiment, the LF display assembly may include LF display modules 620 that all are configured to produce and utilize light to generate the holographic content. In another example, the LF display assembly may include LF display modules 620 of at least two different types—some that are configured to produce and use light energy and some that are configured to produce and use acoustic energy. In other embodiments, the LF display assembly may additionally incorporate other sensory feedback devices.

Following the outer space adventure example, the LF display assembly may transform the enclosure 610 into a cabin of a spaceship with a window in front of the user stations 615. Note that the window may be a holographic object that is projected into the viewing volume in a location between the user stations 615 and the wall of LF display modules 620. In this embodiment, the viewers could look through the holographic object (i.e., the window) into space. Moreover, space and the objects therein could be represented from infinity up to the holographic object. In some embodiments, the LF display assembly may display various command modules all around the enclosure 610 simulating a spaceship. Additionally, the LF display assembly may generate holographic content such as asteroids or other spaceships (which may include background 2D visual content). The LF display assembly may also display holographic content on any physical object in the enclosure 610. For example, the LF display assembly may transform the view for people sitting on user stations 615 to be the view one would have from seats on a spaceship. In the example with the blank dashboard, the LF display assembly may transform the dashboard into a spaceship dashboard with various buttons, displays, sliders, graphs, etc. The physical dashboard may also have pressure sensors integrated so as to record any force applied that can translate to a viewer pressing a button on the holographic dashboard. Alternatively, the tracking system (i.e., the tracking system 580) can track body movement of the viewers as one or more of the viewers interact with the holographic dashboard. In response, the LF display system may respond with content according to the viewers' inputs. For example, in response to pressing a "fire missile" button on the holographic dashboard, the LF display system may generate holographic content through the spaceship's window showing a missile being fired at an enemy spaceship. Additionally, the LF display system may present audio content corresponding to a missile being fired from the spaceship.

In other examples, the LF display system 600 may be used to simulate other various interactive experiences, such as a safari adventure or an underwater excursion. In the example of the safari adventure, the LF display system 600 may generate holographic objects to transform the view for people sitting on user stations 615 to be consistent with the view from within a jeep or similar vehicle. The frame of the jeep may also be displayed as a holographic object by the LF display system 600. Additionally, the LF display system 600 may motorize the user stations 615 so as to mimic movement of the vehicle whilst traversing the safari. The LF display system 600 may generate holographic objects such as safari animals or trees as the jeep traverses the safari. In one or more portions of the safari adventure, the viewers may be asked to move freely about the enclosure 610. During these portions of time, the viewers may move around the enclosure 610 interacting with various holographic objects placed around the enclosure 610. The LF display system 600 may additionally utilize a tracking system (i.e., the tracking system 580) to track viewer movement for updating holographic objects to track with the viewer movement. For example, a holographic zebra may walk alongside a viewer's movement around the enclosure 610. The LF display system 600 may additionally provide sensory stimuli to better immerse the viewers. Additional sensory stimuli for the safari adventure may include an increase in heat within the enclosure 610, occasional winds blowing through the enclosure 610, or audio cues of the various safari animals.

The LF display system 600 provides an improved system for display content in amusement park rides compared to conventional systems. The LF display system 600 may utilize LF display modules 620 all around the enclosure 610 to form a six-sided seamless surface environment for generating holographic content. Compared to conventional amusement park rides where viewers would simply be seated in front of an electronic display that presented 2D content or 3D stereoscopic content, the LF display system 600 generates holographic content including holographic objects that have different viewable perspectives when looking at the holographic objects from various points of view. Moreover, with 3D stereoscopic content, viewers are required to wear eyewear devices for merging the stereoscopic images. The LF display system 600 allows for viewers to view the holographic content without need for eyewear devices or VR/AR Headsets.

Figure 6B:
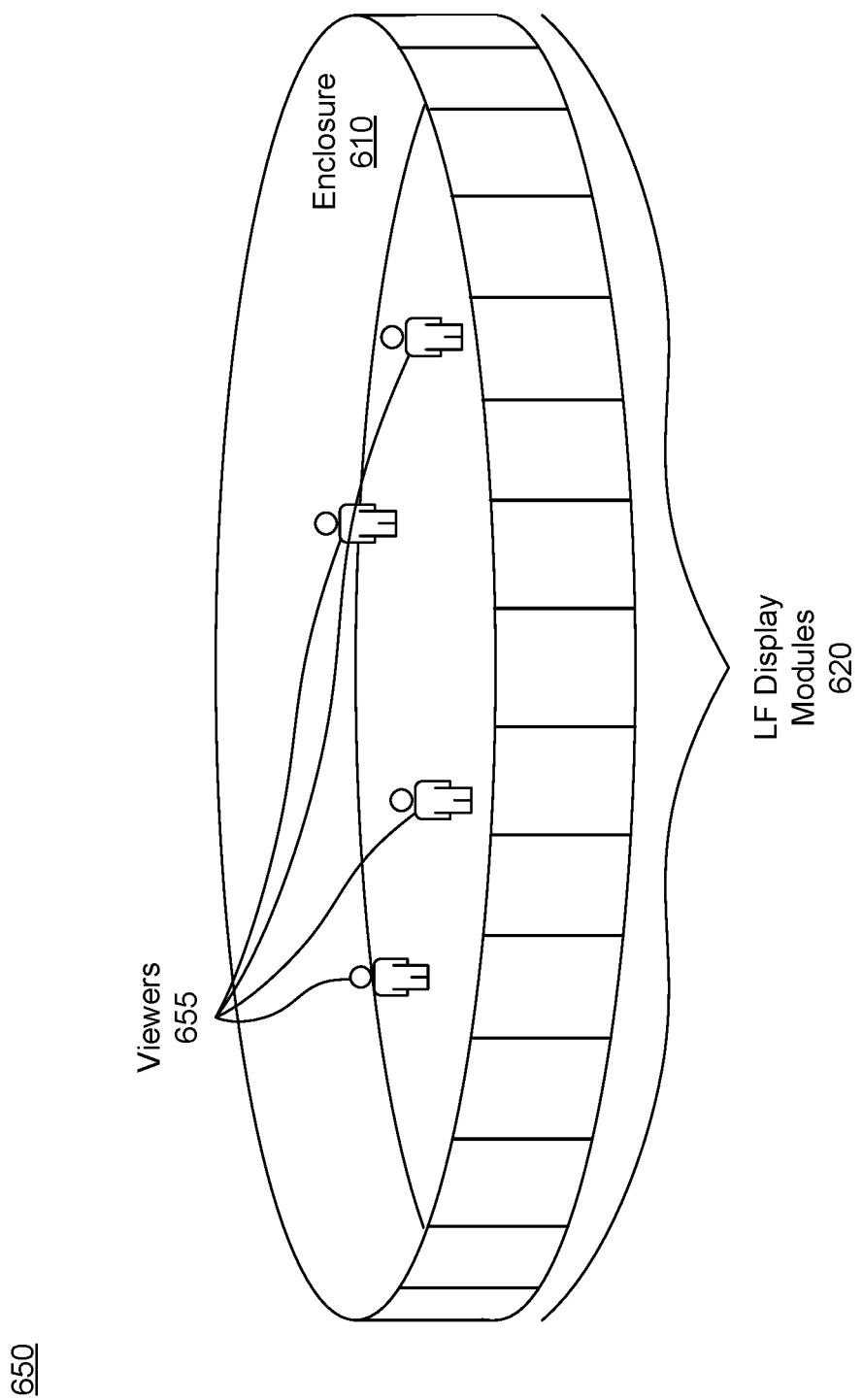
FIG. 6B is an illustration of a light field display system in a cylindrical geometry that is implemented as part of an amusement park ride presenting holographic content to one or more viewers, in accordance with one or more embodiments.

FIG. 6B is an illustration of a LF display system 650 in a cylindrical geometry that is implemented as part of an amusement park ride presenting holographic content to one or more viewers 655, in accordance to an embodiment. The LF display system 650 is an embodiment of the LF display system 500 and may additionally include other various components such as any of the components in the LF display system 500. In the LF display system 650, holographic content is projected by a series of LF modules 620 which may be placed on the floor, on the walls, and on the ceiling of an enclosure 610. In this embodiment, the geometry of the enclosure 610 is such that the LF display system 650 has a cylindrical configuration. Throughout the enclosure 610, the LF display system 650 provides holographic content to viewers 655. In some embodiments, the holographic content provides a simulated environment that appears to be the same size as or smaller than the enclosure 610 with holographic objects being presented in front of a plane of at least one LF display surface (e.g., the display area 150). For example, the LF display system 650 provides holographic content that simulates one or more walls within the enclosure 610. In other embodiments, the holographic content provides a simulated environment that appears larger than the actual dimensions of the enclosure 610 with holographic objects being presented within the holographic object volume of the LF display surfaces, including in front of the plane of at least one LF display surface, behind the plane of at least one LF display surface (e.g., the display area 150), and split by the plane of at least one LF display surface. For example, the LF system 650 is configured to present an ocean experience, offering holographic content including water, coral reefs, a shipwreck, and fish on the walls, ceiling, and floor of the enclosure 610. Viewers are provided a holographic experience of being underwater, with fish appearing to swim from infinity to suspension before the viewers 655. In another example, the LF display system 650 presents an extended environment far beyond the confines of the enclosure for viewers that wish to move around and explore the extended environment. This may be achieved with content that offers gradual space alterations and floor remapping to allow the viewer to feel that he or she is in a large space (or even a space with infinite extent) which dynamically adjusts to the motion of the viewer.

The LF display system 650 comprises a sensory feedback system (i.e., the sensory feedback system 570) comprising at least one sensory feedback device that is configured to provide sensory feedback as the holographic content is presented. The sensory feedback can include movement feedback, tactile feedback, audio feedback, aroma feedback, temperature feedback, some other type of feedback, or any combination thereof. In some embodiments, the LF display assembly is configured to generate a tactile surface in a local area of the LF display assembly 650. The tactile surface may be coincident with a surface of at least one of the one or more holographic objects. The LF display system 650 may have a tracking system (i.e., the tracking system 580) comprising one or more tracking devices configured to obtain information about the one or more viewers 655 of the amusement park ride and wherein the controller is configured to generate the holographic content for the one or more viewers 655 based on the information obtained by the tracking system. The information obtained by the tracking system includes any of a position of the viewer, a movement of the viewer, a gesture of the viewer, an expression of the viewer, an age of the viewer, a gender of the viewer, an identification of a piece of a garment worn by the viewer, and auditory feedback of the viewer. For example, when the tracked information is a gaze of the viewer, the LF display system 650 is configured to perform an action (e.g. adjusts a holographic object, adjusts a control interface, adjusts an arrangement of the one or more holographic objects, some other adjustment action, or some combination thereof) based on the gesture. In another example, the controller is configured to use the information obtained by the tracking system and an AI model to generate holographic content. The LF display system 650 comprises a viewer profiling module (i.e., the viewer profiling module 528) configured to access the information obtained by the tracking system, process the information to identify a viewer of the one or more viewers of the enclosure, and generate a viewer profile for the viewer. The controller is configured to generate the holographic character for the viewer based in part on the viewer profile. In one embodiment, the controller is configured to use the viewer profile and an AI model to generate holographic content. The viewer profiling module may be further configured to update the viewer profile using information from a social media account of the viewer and the controller is configured to generate the holographic character based in part on the updated viewer profile. In other embodiments, the controller is configured to use the viewer profile (an updated viewer profile) and an AI model to generate holographic content.

In an embodiment, the LF display assembly includes at least one LF display module that has a bidirectional LF display surface which simultaneously projects holographic objects and senses light from a local area adjacent to the LF display modules 620. A bidirectional LF display surface may simultaneously project energy and sense energy from the display surface. In some embodiments, the bidirectional LF display surface may simultaneously project a light field and record a light field from the area in front of the display surface formed by the LF display modules. In an embodiment, this bidirectional display surface may comprise a seamless energy surface 360 shown in FIG. 3B which contains both emissive light source sites and light sensor sites underneath the waveguide elements 370. Other arrangements are also possible.

Figure 7:
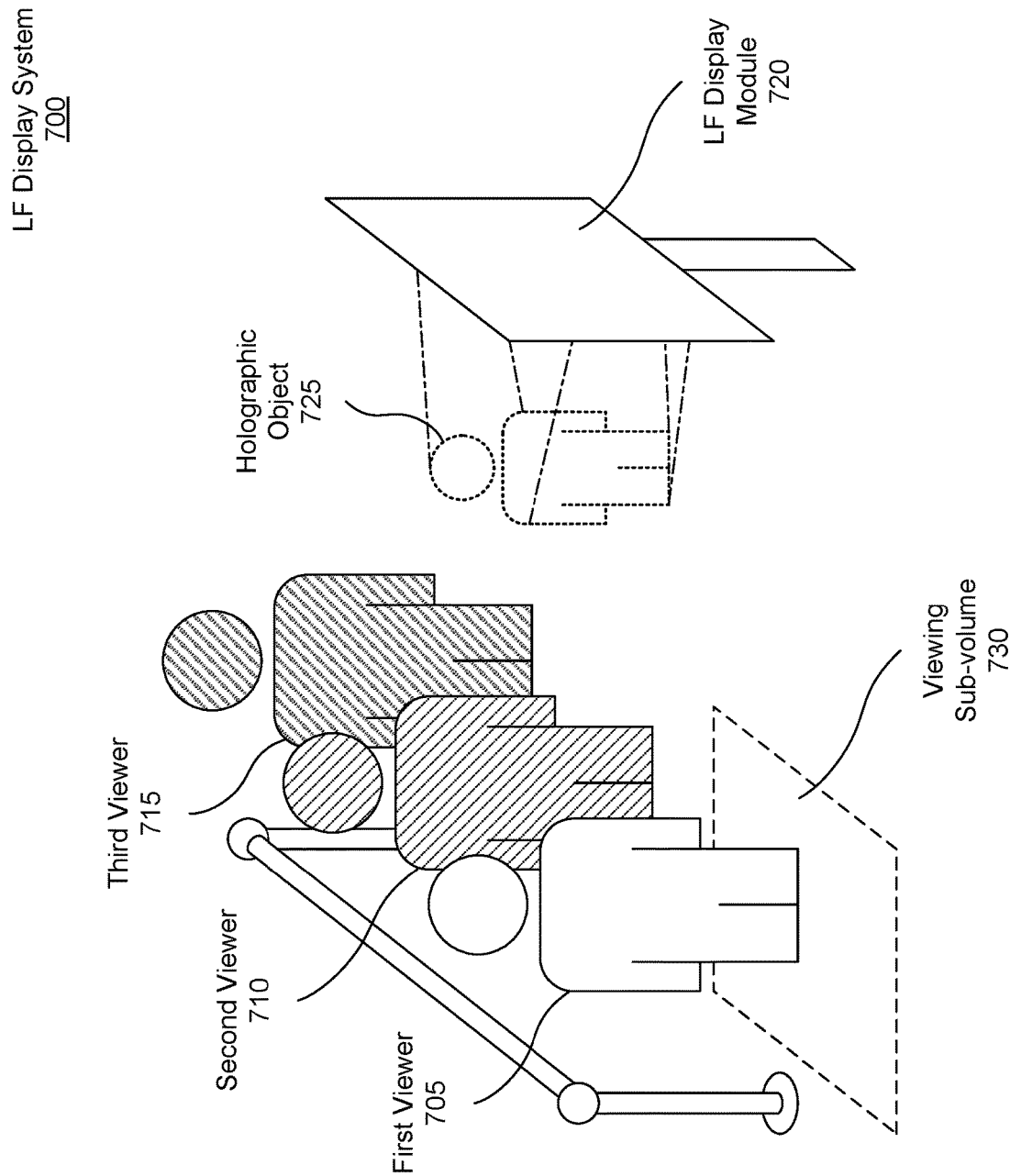
FIG. 7 is an illustration of a light field display system implemented as part of a queue to an amusement park ride presenting content to one or more viewers in the queue, in accordance with one or more embodiments.

FIG. 7 is an illustration of a LF display system 700 implemented as part of an amusement park queue presenting content to one or more viewers in the queue, in accordance to an embodiment. The LF display system 700 may be an embodiment of the LF display system 500. In other embodiments, the LF display system 700 may be implemented as part of any other queue in an amusement park, e.g., a queue for an amusement park ride, a queue for a food stand, a queue for a bathroom, a queue for a camera stand or a queue to a help desk stand. The LF display system 700 includes a queue of viewers—including a first viewer 705, a second viewer 710, and a third viewer 715—with a LF display assembly (an embodiment of the LF display assembly 510) for generating holographic objects to one or more viewers of the amusement park queue. The LF display assembly includes one or more LF display modules (embodiments of the LF display modules 110 and 210) placed on either or both sides of the queue. In the illustration of FIG. 7, the LF display system 700 has one LF display module 720 on one side of the queue.

As with the LF display systems discussed above, the LF display system 700 utilizes the LF display module 720 to generate holographic content to viewers of the amusement park queue. The LF display system 700 presents the holographic content to one or more viewers located in the viewing volume. The viewing volume includes a viewing sub-volume, and the LF display modules 720 present the holographic content to a viewer located in the viewing sub-volume. In this example, the presented holographic content is visible from inside the viewing sub-volume and is not visible from outside the viewing sub-volume. As viewers wait in the queue, the LF display assembly using the LF display module 720 presents holographic object 725 to viewers in the queue. Similar to the LF display systems discussed above, the LF display system 700 may incorporate other sensory feedback devices for providing sensory stimuli in complement to the holographic content. In some embodiments, a viewing sub-volume 730 is a portion of the viewing volume of the LF display module 720 which may be used to limit visibility of the holographic objects 725 displayed by the LF display assembly. For example, only viewers standing within the viewing sub-volume 730 (e.g., the first viewer 705 but not the second viewer 710 nor the third viewer 715) can view the holographic objects 725. In one example, the LF display module 720 may display a holographic content that includes a holographic character themed according to the amusement park ride (e.g., a robot or a character from a movie). The holographic character may interact with the viewers (e.g., look at, speak to, listen to, touch, or some combination thereof). In another example, the LF display module 720 may display a questionnaire to the viewers with which the viewers may provide their responses, e.g., verbal responses recorded by an acoustic receiving device, physical movements recorded by a camera of a tracking system, or force applied on physical objects recorded by pressure sensors of a sensory feedback system. Similar to the holographic dashboard described above in FIG. 6A, the LF display module 720 may receive user input through implementing a tracking system (i.e., the tracking system 580) and/or a sensory feedback system (i.e., the sensory feedback system 570).

In some embodiments, the LF display system 700 includes a tracking system (i.e., the tracking system 580). The tracking system may comprise a source assembly and/or a camera assembly for tracking viewers waiting in the queue. The tracking system is configured to track responses of a viewer of the one or more viewers to the presented holographic content within the viewing volume and the controller of the LF display system 700 is configured to update the presented holographic content based on the tracked response (e.g., a position of the viewer, a movement of the viewer, a gesture of the viewer, an expression of the viewer, a gaze of the viewer, and auditory feedback of the viewer, some other tracked response, or some combination thereof). The tracking system tracks movement of viewers in the viewing volume of the LF display system 700. The tracking system may make use of viewers' body movements for rendering new holographic content. In some embodiments, a viewer's body movements may correspond to user inputs in response to presented holographic content. For example, as the viewer is prompted with a holographic questionnaire, the viewer may respond by pointing a finger at an option in the holographic questionnaire. The tracking system may track the finger position as a selection of one or more of the options in the holographic questionnaire. In other embodiments, the controller of the LF display system 700 uses the information obtained by the tracking system and an AI model to generate the holographic content. In further embodiments, the tracked response of the viewer includes the gaze of the viewer and the LF display assembly is configured to update eyes of the holographic character to maintain eye-contact with the gaze of the viewer. In other embodiments, the tracked response includes the gazes of a plurality of viewers and the LF display assembly is configured to update the holographic character's eyes to alternate directing eye-contact between the plurality of viewers. In some additional embodiments, the tracking information may be considered with audio recorded by an acoustic receiving device of the sensory feedback system (i.e., the sensory feedback system 570). The LF display system 700 can further identify who within a group of viewers is currently speaking and may determine to re-render the holographic character's eyes to make eye-contact with the viewer whom is speaking. In even further embodiments, the LF display system 700 may render additional content in response to tracking information. The LF display system 700 may also provide sensory feedback (e.g., tactile feedback, aroma feedback, temperature feedback, or some other type of sensory feedback) according to the tracking information. For example, the LF display assembly may render the holographic character to touch a viewer. Accordingly, the LF display assembly may generate an acoustic pressure wave via an ultrasonic emitter to simulate tactile touch from a portion of the holographic character and/or the sensory feedback system may simulate the touch of the holographic character by providing a tactile surface coincident with a surface of the holographic character. For example, the holographic character is a furry monster and viewers may touch or be touched by the furry monster (e.g., viewer would feel coarse, short hair).

In some embodiments, the LF display system 700 includes a viewer profiling module (i.e., the viewer profiling module 528). The viewer profiling module logs each viewer visiting the amusement park ride for personalized holographic content in subsequent visits. The viewer profiling module is configured to identify a viewer of the one or more viewers within the viewing volume and generate a viewer profile for the viewer. The controller of the LF display system 700 generates the holographic content for the viewer based in part on the viewer profile. In other embodiments, the controller uses the viewer profile and an AI model to generate the holographic content. The viewer profiling module may include sensors for identifying the viewers as they wait in the queue. These sensors may include facial recognition scanners or card identification scanners. In some examples, viewers may be given some physical identification token such as a barcode on a wristband. Paired with a barcode scanner, the viewer profiling module may positively identify the viewer waiting in the queue. Viewer profile includes information about the holographic preferences of the viewer, the in-park purchases of the viewer, the status of the viewer, the frequency of visiting each ride in the amusement park of the viewer, the wait times of the viewer for each amusement park ride, the frequency between visits to one particular ride in the amusement park of the viewer, some other information about the viewer, or some combination thereof. In some embodiments, an amusement park may have tiers of viewers (e.g., regular, season pass holder or very important person (VIP)). In these embodiments, the tracking system 700 may additionally determine a viewer's status (e.g., as regular, season pass holder, or VIP) and provide holographic content specific to that viewer's status. For example, a viewer that is a VIP can be presented with bonus holographic content or the LF display system 700 may capture an image free of charge for the VIP viewer.

In some embodiments, the viewer profiling module may suggest another amusement park ride to an identified viewer. The viewer profiling module may identify an approximate wait time for viewers in the queue. The viewer profiling module may then coordinate with an LF display system of another amusement park ride to compare approximate queue wait times. The LF display system 700 may then evaluate whether or not to suggest to subsequent viewers entering the queue that another amusement park ride has a lesser wait time. Additionally, the LF display system 700 may access the viewer profile of an identified viewer. Upon accessing the viewer profile, the LF display system 700 presents holographic content that includes personalized holographic content, amusement park ride suggestions, an amusement park ride wait time, or some combination thereof.

In some additional embodiments, the viewer profiling module may build viewer profiles for each of the viewers to store viewer preferences or other viewer characteristics. The viewer profiles may be built with the tracking system or with another component of the LF display system 700 such as a controller (i.e., the controller 520) and stored in a data store (i.e., the data store 522). The viewer profiles may be built for each viewer with all the data collected by the viewer profiling module. Additionally, other components such as a tracking system or sensory feedback system may provide data to the viewer profile to be stored in the viewer profile store.

The LF display system 700 may utilize the viewer profiling module to personalize holographic content to the viewer during each subsequent visit to the amusement park ride. For example, the LF display system 700 addresses the viewer by name (e.g., visually or audio-wise). In other examples, the LF display system 700 generates holographic content corresponding to the viewer's response to previously generated holographic content. Alternatively, the viewer profiling module may be used in the amusement park ride to enhance the amusement park ride. Following the safari adventure example, a viewer in the queue may be prompted by the LF display system 700 regarding the viewer's animal preferences. In the safari adventure, the LF display system 600 can then generate holographic content according to the provided animal preferences for that viewer.

The LF display system 700 provides an improved system for displaying content in amusement park rides compared to conventional systems. As the LF display system 700 utilizes the LF display module 720 for generating holographic content, the LF display module 720 may be used in replacement of animatronic robots which are conventionally used in amusement park rides. Animatronic robots are costly to maintain and can at most present a single object (e.g., one character for the amusement park ride). However, the LF display system 700 has the ability to provide a range of holographic content. Moreover, the LF display system 700 has easily maintainable components compared to the complex machinery of the animatronics used conventionally.

Figure 8A:
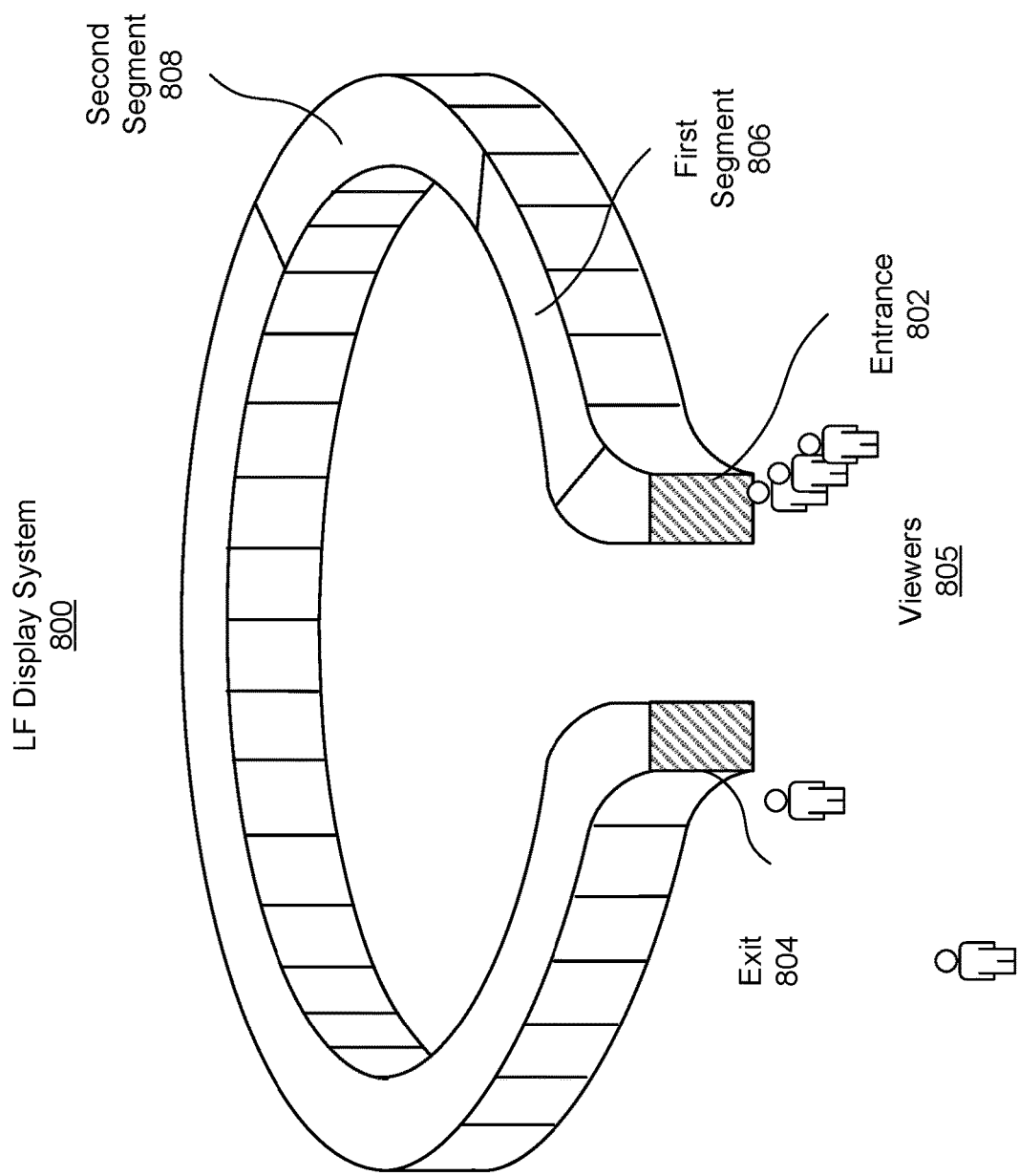
FIG. 8A is an illustration of a light field display system implemented as part of an amusement park ride presenting holographic content to one or more viewers, in accordance with one or more embodiments.

There are multiple configurations for LF display systems to be implemented as a part of an amusement park ride. FIG. 8A is an illustration of such a LF display system 800 implemented as part of an amusement park ride presenting holographic content to one or more viewers 805, in accordance to an embodiment. The LF display system 800 is an embodiment of the LF display system 500. In some embodiments, the LF display system 800 is constructed as enclosure through which viewers are moved from one end to another. In one embodiment, the enclosure is curved, e.g., "c" shaped, such that viewers enter the enclosure at an entrance 802 that is proximate to an exit 804 where they exit the enclosure. The LF display surface is curved in at least one dimension. In another embodiment, the LF display system 800 comprises at least one curved wall forming a curved path for the one or more viewers 805 to traverse, and the curved wall comprises at least one curved LF display surface formed by the plurality of LF display modules that are tiled together to form a seamless surface environment. In another embodiment, the enclosure can be a straight corridor with multiple segments. Throughout the enclosure, the LF display system 800 provides holographic content to viewers. In LF display system 800, the amusement park's LF display system 800 is a curved enclosure that includes an LF display assembly with LF display modules throughout the enclosure (e.g., on all walls, ceiling, and floor). The LF display system 800 may additionally include other various components such as any of the components in the LF display system 500. In one example, the LF display system 800 is configured to operate as a safari adventure providing holographic content corresponding to the safari adventure.

The LF display system 800 has a LF display assembly for providing holographic content to viewers of the amusement park ride. The LF display system 800 moves one or more viewers through the enclosure to provide holographic content to the viewers. The LF display system 800 may move the viewers in various manners. In one embodiment, the LF display system 800 may allow the viewers to freely move throughout the enclosure. In one example, the LF display system 800 may be akin to an exhibit where viewers may leisurely walk throughout the LF display system 800 interacting with holographic content. In another embodiment, the LF display system 800 contains a user station that transports viewers throughout the enclosure along a path. The vehicle may contain one or more viewers and may be rigged with a sensory feedback system similar to the user stations 615 of the LF display system 600. In some embodiments, the LF display assembly comprises LF display modules (e.g., LF display modules 110 and 210) integrated on all walls, floor, and ceiling of the enclosure. The LF display system 800 may augment portions of the user station with holographic content in a manner similar to that described above in FIG. 6A with regard to the user stations 615. The LF display system 800 may display holographic content viewable by all viewers with a direct line of sight or may display holographic content viewable only by viewers within a portion of the viewing volume (e.g., a sub-volume) of the LF display system 800. The LF display system 800 may also incorporate a sensory feedback system for providing other sensory stimuli to augment the holographic content provided by the LF display assembly implemented throughout the enclosure.

In one embodiment, the LF display system 800 may virtually segment the enclosure by generating a holographic wall that effectively occludes portions of the enclosure to viewers. The LF display system 800 may comprise a tracking system configured to track a location of each viewer 805 within the viewing volume of the enclosure, and the presented holographic content may include a first holographic object for a first viewer within a first portion of the viewing volume (e.g., the first segment 806) and a second holographic object for a second viewer within a second portion of the viewing volume (e.g., the second segment 808). In this example, the first holographic object is presented within a first portion of the holographic object volume that is visible from the first portion of the viewing volume and is not visible from the second portion of the viewing volume. In other embodiments, the second holographic object is presented within a second portion of the holographic object volume that is visible from the second portion of the viewing volume and is not visible from the first portion of the viewing volume, and the first holographic object is different from the second holographic object. In this example, the enclosure may allow multiple groups of viewers to move through the enclosure together while being able to present staged holographic content to each group. For example, the LF display assembly 800 can segment the enclosure into four segments by generating holographic walls and doors that intersect the enclosure. As one group of viewers moves into a first segment 806, a holographic wall shuts behind them. The viewers movement out of and into different segments is tracked by a tracking system (i.e., the tracking system 580). During the time that the group of viewers can only view holographic content presented within the first segment 806. Similarly, others outside of the first segment 806 would not be able to perceive the holographic content presented within the first segment 806. Then that group of viewers may be shuttled to a second segment 808 where another holographic wall shuts behind them. At that time another group of viewers may be moved into the first segment 806. In embodiments where the enclosure is circular, the groups of viewers may be timely moved from one portion of the enclosure to the next such that each group of viewers cannot see the group ahead or the group behind because of the curvature of the enclosure. Likewise, holographic content viewable by one group would not be viewable by another as the holographic content would not be in direct line of sight to the other group. For the safari example, segments of the enclosure may be used to present holographic animals or scenery for one location in the safari. Alternatively, segments of the enclosure may be used to present different herds of holographic animals.

In another embodiment, the LF display system 800 comprises a tracking system (i.e., the tracking system 580) configured to track responses of the viewers 805. The tracking system may record viewer responses to holographic content within the amusement park ride. The LF display system 800 comprises a viewer profiling module (i.e., the viewer profiling module 528) configured to access the responses obtained by the tracking system, process the responses to identify a viewer of the one or more viewers 805 of the amusement park ride, and generate a viewer profile for the viewer. The controller of the LF display system 800 is configured to generate the holographic content for the viewer based in part on the viewer profile. For example, in LF display system 800, as viewers pass through the first segment 806, the LF display system 800 may record viewer responses. The LF display system 800 may further employ, e.g., AI models including machine learning and/or neural networks to develop viewer profiles that include preferences of the viewers. The LF display system 800 can generate new holographic content tailored to the viewers according to the viewer responses and/or the learned preferences. In an example of a haunted house, the LF display system 800 may record a viewer's reaction to certain scary holographic content presented in the first segment 806. In the second segment 808, the LF display system 800 may continue or increase displaying of scary holographic content that was highly effective in scaring (e.g., elicits a loudest audible reaction as captured by an acoustic receiving device of the LF display system 800) the LF display system 800 will stop or decrease displaying of other holographic content that was not as effective in scaring the viewer. The LF display system 800 may further record viewer responses in viewer profiles that can be maintained for tailoring holographic content on subsequent visits to the amusement park ride.

In some embodiments where the enclosure is curved (e.g., circular), the LF display system 800 may provide an illusion of moving in a straight line when movement is actually along a curved path. The LF display system 800 presents holographic content that includes a pathway for the one or more viewers 805 to traverse that has less curvature than a curvature of the at least one curved LF display surface. In this example, the LF display assembly of the LF display system 800 generates holographic content to produce an illusion of moving in a straight line through the curved enclosure. The LF display assembly is an embodiment of the LF display assembly 510. The walls (and in some cases the ceiling and/or floor) of the curved enclosure are integrated with LF display modules which make up the LF display assembly. Depending on a curvature of the curved enclosure, the LF display assembly may generate holographic content that skews to a certain amount the holographic content to compensate for the curvature. For example, although the enclosure bends due to the curvature, the holographic content presented may indicate a pathway that is more directly in front of the viewer rather than offset according to the curvature of the enclosure. The curvature of the enclosure can be determined to be below a threshold amount, so that the illusion is more believable to viewers. As a result, the LF display assembly may trick viewers into imagining that the curved enclosure is rather a straight enclosure.

In some embodiments where viewers are unconstrained (e.g., may freely roam the enclosure), the LF display system 800 may redirect viewers from colliding with any physical objects. The LF display system 800 may use the LF display assembly to redirect a viewer by generating holographic content that presents an obstacle. For the safari adventure example, the LF display assembly presents a holographic tree or rock on the safari adventure which would be undesirable for a viewer to proceed through the tree or rock. In another embodiment, the LF display system 800 may use a sensory feedback system to redirect a viewer. As mentioned above in discussion of sensory feedback system 570, the sensory feedback system may use sensory stimuli to redirect the viewer (e.g., audible signal or tactile acoustic pressure wave).

Figure 8B:
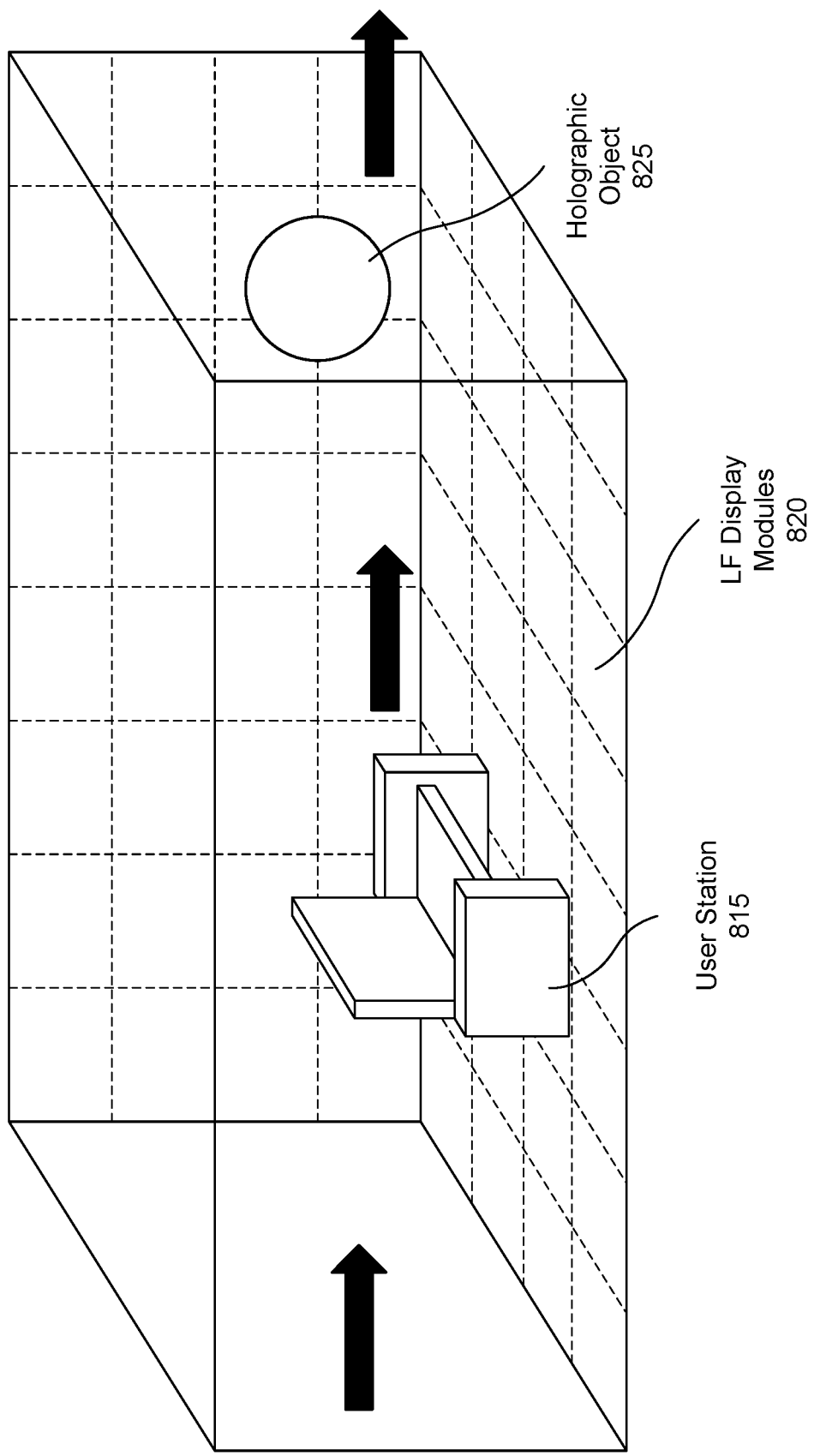
FIG. 8B is an illustration of a portion of the light field display system of FIG. 8A, in accordance with one or more embodiments.

FIG. 8B is an illustration of a portion of the LF display system 800 of FIG. 8A, in accordance with an embodiment. In one or more embodiments, the curved enclosure of the LF display system 800 may be a walkway and/or a track for a user station. In one of these embodiments, the enclosure is simply a walkway and allows viewers to freely roam through the enclosure. In this example, the LF display system 800 may be configured as a haunted house where viewers walk themselves through the enclosure. In another embodiment, the enclosure may include a track for a user station to move through portions of the enclosure. The user station may be substantially similar to the user station 615 described above with reference to FIG. 6A. In another embodiment, the user station may be a boat floating in a river that runs along a floor of the enclosure. In some cases, the river is holographic content, in other embodiments, it is a physical waterway that moves through some or all of the enclosure. In the embodiment of FIG. 8B, the LF display system 800 includes a user station 815 which moves the viewer through the enclosure in a first direction. The user station 815 can at least seat one or more viewers and may include a frame or dashboard. The user station 815 may be transformed with holographic content to appear differently (e.g., as a jeep in the safari adventure example). In additional configurations, the user station 815 may seat additional viewers. In some embodiments, viewers may exercise some control over the user station 815. The LF display system 800 may generate a holographic dashboard which can receive viewer input (via, e.g., a sensory feedback system 570, a tracking system 580). The viewers may then start or stop the user station 815 when desired. In the safari adventure example, the viewers may choose when to stop their safari jeep to explore the surrounding holographic content. The amusement park ride may also deploy user stations at some frequency such that there is some separation from each user station 815. In some embodiments, the enclosure may comprise segments with user stations on tracks and segments for walking around. In the safari adventure example, portions of the enclosure have user stations (e.g., user station 815) that appear as safari jeeps that transport the viewer along the enclosure. In other portions the enclosure has no user station, and the viewer walks freely within that portion. Some or all of the enclosure is covered with LF display modules 820 (embodiments of the LF display module 110 and 210) for generating holographic content including a holographic object 825 to viewers of the amusement park ride.

In one embodiment, the LF display system 800 generates varying holographic content viewable by each of the viewers 805. In these embodiments, the LF display system 800 may generate a holographic object 825 viewable only by viewers 805 on the user station 815. Other viewers 805 at a different portion of the LF display system 800 may be presented with other holographic content. This is an advantage to operating the amusement park ride as the amusement park ride can have multiple waves of one or more viewers moving through the amusement park ride at any time. Furthermore, being able to generate holographic content specific to each wave of viewers provides an easy manner of tailoring the amusement park ride to each wave of viewers. Conventional manners of adjusting an amusement park ride may take hours or days to reprogram the amusement park ride. However, with the LF display system 800, the amusement park ride may easily adjust the holographic content provided to the viewers.

Other conventional systems also incorporate physical décor and/or animatronics all along the enclosure. The physical décor and/or animatronics are difficult to maintain and not easily interchangeable. The LF display system 800 is better in that the holographic content can be easily rendered or adjusted. Likewise, the LF display system 800 diminishes time and effort for maintenance and repairs.

The LF display system 800 may also include a tracking system that tracks positions of viewers within the enclosure. The LF display system 800 may present one or more holographic objects that are customized to each viewer based in part on the tracking information. In this manner, viewers that are at least a threshold distance from each other (e.g., a couple feet) are able to see completely different holographic content. For example, the LF display system 800 tracks a position of each of the viewers and determines perspectives of holographic objects that should be visible to the viewers based on their tracked positions relative to where the holographic objects would be presented. The LF display system 800 selectively emits light from specific pixels of the LF display modules, the specific pixels corresponding to the determined perspectives. Accordingly, different viewers that are close to each other can simultaneously be presented with completely different holographic content. For example, a viewer may be presented with holographic objects that are space related, whereas a different viewer is simultaneously being presented with holographic objects that are safari related.

In some embodiments, the LF display system 800 may customize holographic content based in part on characteristics of the viewers. For example, the holographic content presented to the viewers may all share a common theme (e.g., safari or space), but specific content may be adjusted based in part of characteristics of the viewers. For example, an adult may be presented with an R-rated version of lions killing buffalo, whereas a child is presented with a G-rated version. In contrast, for conventional systems to provide such individualized content would require the viewers to have individual AR/VR headsets.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A light field (LF) display system comprising:
a controller configured to generate holographic content; and
a LF display assembly comprising one or more LF display modules that are configured to present the holographic content in a holographic object volume to one or more viewers located in a viewing volume of the one or more LF display modules of an amusement park ride.

2. The LF display system of claim 1, further comprising: a sensory feedback system comprising at least one sensory feedback device that is configured to provide sensory feedback as the holographic content is presented.

3. The LF display system of claim 2, wherein the sensory feedback includes tactile feedback, audio feedback, aroma feedback, temperature feedback, or any combination thereof.

4. The LF display system of claim 1, further comprising:
a tracking system comprising one or more tracking devices configured to obtain information about the one or more viewers of the amusement park ride; and
wherein the controller is configured to generate the holographic content for the one or more viewers of the amusement park ride based in part on the information obtained by the tracking system.

5. The LF display system of claim 4, wherein the information obtained by the tracking system includes any of a position of the viewer, a movement of the viewer, a gesture of the viewer, an expression of the viewer, an age of the viewer, a gender of the viewer, and identification of a piece of a garment worn by the viewer.

6. The LF display system of claim 4, wherein the controller is configured to use the information obtained by the tracking system and an artificial intelligence model to generate the holographic content.

7. The LF display system of claim 4, further comprising:
a viewer profiling module configured to:
access the information obtained by the tracking system;
process the information to identify a viewer of the one or more viewers of the amusement park ride; and
generate a viewer profile for the viewer; and
wherein the controller is configured to generate the holographic content for the viewer based in part on the viewer profile.

8. The LF display system of claim 7, wherein the controller is configured to use the viewer profile and an artificial intelligence model to generate the holographic content.

9. The LF display system of claim 7, wherein the viewer profiling module is further configured to:
update the viewer profile using information from a social media account of the viewer; and
wherein the controller is configured to generate the holographic content based in part on the updated viewer profile.

10. The LF display system of claim 9, wherein the controller is configured to use the updated viewer profile and an artificial intelligence model to generate the holographic content.

11. The LF display system of claim 4, further comprising:
a viewer profiling module configured to:
access the information obtained by the tracking system;
process the information to identify the one or more viewers of the amusement park ride; and
generate an aggregate viewer profile for the one or more viewers; and
wherein the controller is configured to generate the holographic content for the one or more viewers based in part on the aggregate viewer profile.

12. The LF display system of claim 11, wherein the viewer profiling module is further configured to:
update the aggregate viewer profile using information from at least one or more social media accounts of the one or more viewers; and
wherein the controller is configured to generate holographic content based in part on the updated aggregate viewer profile.

13. The LF display system of claim 1, further comprising:
a user station configured to be occupied by the viewer and to move relative to the one or more LF display modules, and
wherein the controller is configured to generate holographic content based in part on relative movement between the user station and one or more LF display modules.

14. The LF display system of claim 13, wherein the user station is configured to move and the one or more LF display modules are stationary.

15. The LF display system of claim 14, wherein the user station includes at least one of a motor-controlled chair, a motor-controlled bench, a motor-controlled stool, a motor-controlled cart, a carriage, a vehicle, a motor-controlled floor, or a motor-controlled platform.

16. The LF display system of claim 13, wherein the one or more LF display modules are configured to move and the user station is stationary.

17. The LF display system of claim 1, wherein the presented holographic content of the amusement park ride includes a holographic character.

18. The LF display system of claim 17, further comprising:
- a sensory feedback system comprising at least one sensory feedback device that is configured to provide sensory feedback as the holographic character is presented.

19. The LF display system of claim 18, wherein the sensory feedback includes tactile feedback, audio feedback, aroma feedback, temperature feedback, or any combination thereof.

20. The LF display system of claim 19, wherein the tactile feedback is configured to provide a tactile surface coincident with a surface of the holographic character that the one or more viewers may interact with via touch.

* * * * *